US007721950B1

(12) United States Patent
Graef et al.

(10) Patent No.: US 7,721,950 B1
(45) Date of Patent: May 25, 2010

(54) AUTOMATED TRANSACTION MACHINE

(75) Inventors: H. Thomas Graef, Bolivar, OH (US); R. Matthew Dunlap, North Canton, OH (US); Zachary Utz, North Canton, OH (US); Daniel Schoeffler, Twinsburg, OH (US); Shawn Griggy, North Canton, OH (US); Natarajan Ramachandran, Uniontown, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 280 days.

(21) Appl. No.: 11/544,218

(22) Filed: Oct. 5, 2006

Related U.S. Application Data

(63) Continuation-in-part of application No. 10/688,621, filed on Oct. 17, 2003, now Pat. No. 7,469,823.

(60) Provisional application No. 60/724,671, filed on Oct. 7, 2005, provisional application No. 60/419,681, filed on Oct. 18, 2002, provisional application No. 60/435,153, filed on Dec. 19, 2002.

(51) Int. Cl.
*G06K 5/00* (2006.01)

(52) U.S. Cl. .................................................... 235/379

(58) Field of Classification Search ......... 235/379–382; 902/8, 9, 30, 31; 705/7
See application file for complete search history.

(56) References Cited

U.S. PATENT DOCUMENTS

| | | | | |
|---|---|---|---|---|
| 5,563,393 | A * | 10/1996 | Coutts | 235/379 |
| 6,010,065 | A * | 1/2000 | Ramachandran et al. | 235/379 |
| 6,061,666 | A * | 5/2000 | Do et al. | 705/43 |
| 6,572,013 | B2 * | 6/2003 | Katou et al. | 235/379 |
| 7,143,933 | B2 * | 12/2006 | Uematsu et al. | 235/379 |
| 2005/0280202 | A1 * | 12/2005 | Vila et al. | 271/213 |
| 2005/0284171 | A1 * | 12/2005 | Harl et al. | 62/457.2 |
| 2006/0277970 | A1 * | 12/2006 | Pabich et al. | 72/481.1 |

* cited by examiner

*Primary Examiner*—Thien M. Le
*Assistant Examiner*—Sonji Johnson
(74) *Attorney, Agent, or Firm*—Ralph E. Jocke; Daniel D. Wasil; Walker & Jocke

(57) ABSTRACT

An ATM apparatus includes a sheet storage container selectively positionable within the secure chest portion of the ATM. A monitoring mechanism provides audible feedback when the sheet storage container is moved into an operational position. The sheet storage container can be a free-fall container or a stacking cassette.

20 Claims, 13 Drawing Sheets

AUTOMATED TRANSACTION MACHINE

CROSS REFERENCE TO RELATED APPLICATIONS

This application claims benefit pursuant to 35 U.S.C. §119 (e) of Provisional Application 60/724,671 filed Oct. 7, 2005, the disclosure of which is incorporated herein by reference.

This application also claims benefit pursuant to 35 U.S.C. §120 of U.S. application Ser. No. 10/688,621 filed Oct. 17, 2003, which claims benefit pursuant to 35 U.S.C. §119(e) of provisional applications 60/419,681 filed Oct. 18, 2002 and 60/435,153 filed Dec. 19, 2002, the disclosures of each of which are incorporated herein by reference.

TECHNICAL FIELD

This invention relates to automated banking machines. Specifically embodiments relate to automated banking machines that have the capability of receiving financial instrument sheets such as notes, checks and other documents from users. Further embodiments relate to automated banking machines capable of receiving currency notes and recycling the currency back into circulation. Further embodiments relate to constructions and interrelationships of machine components to improve service and serviceability of the machines.

BACKGROUND ART

A common type of automated banking machines used by consumers is an automated teller machine ("ATM"). ATMs enable customers to carry out banking transactions. Banking transactions carried out using ATMs may include the dispensing of cash, the making of deposits, the transfer of funds between accounts and account balance inquiries. The types of banking transactions a customer can carry out are determined by the capabilities of the particular banking machine and the programming of the machine of the institution operating the machine. For purposes of this disclosure an automated banking machine shall be deemed to include any machine that may be used to carry out transactions involving transfers of value.

Automated banking machines may be useful because they perform banking functions in a generally rapid and reliable manner. However there are situations where machines must go out of service for preventative maintenance or remedial service. In such cases it is desirable to enable an authorized servicer to complete the maintenance activity as expeditiously as possible. This task is desirably done by enabling ready access to the interior of the machine by authorized servicers while minimizing the risk of unauthorized access by criminals.

In order to carry out the variety of transactions, certain components of the ATM must work in coordinated movement. During servicing or replenishment activities, components must be moved from an operational position to a service position. In order to restore the ATM to an operational condition, the components must be properly re-installed to prevent malfunctions such as sheet jams. In order to achieve the goal of expeditious servicing of ATMs, it is necessary to provide mechanisms to direct and ensure proper realignment of components.

Thus there exists a need for automated banking machines with improved properties related to handling financial instrument sheets, security, and service capabilities.

DISCLOSURE OF INVENTION

It is an object of exemplary embodiments to provide an automated banking machine.

It is a further object of exemplary embodiments to provide an automated banking machine that has improved capabilities for handling financial instrument sheets.

It is a further object of exemplary embodiments to provide an automated banking machine that facilitates proper alignment of ATM components during servicing activities.

Further objects of exemplary embodiments will be made apparent in the following Best Modes for Carrying Out Invention and the appended claims.

Certain of the foregoing objects are accomplished in an exemplary embodiment by an automated banking machine which is an automated teller machine ("ATM"). The ATM includes a user interface which includes input devices for receiving identifying inputs that identify user accounts, as well as inputs from users that cause the machine to carry out transaction functions. The user interface further includes one or more output devices that output indicia such as instructions for a user in operating the machine.

Embodiments of automated banking machines may include note dispensing mechanisms operative to pass notes, currency, or other sheets from a location within the machine to users of the machine. The automated banking machines may include sheet acceptors able to receive a stack comprising one or more sheets from a machine user, to separate each of the sheets, to evaluate each sheet for one or more properties, and to segregate suspected invalid sheets from valid sheets. The sheet acceptor may be adapted to pass valid sheets through a sheet accepting opening in a secure chest portion. Exemplary embodiments may include movable and/or removable sheet acceptors.

Embodiments of automated banking machines may include sheet storage containers adapted to extend in the interior of the secure chest portion. The sheet storage containers are operative to receive sheets that pass through the sheet accepting opening in the chest. The sheet storage containers may be movable and/or removable. The sheet storage containers may be adapted for bulk storage, or alternately, the sheet storage containers may include various transports or mechanisms to stack and sort sheets received through the sheet accepting opening. Additionally, the sheet storage containers may be operatively connected with one or more note dispensing mechanisms, so as to comprise note recyclers whereby received currency may be recycled to users of the machine.

Exemplary embodiments may also include carriage assemblies and mechanisms operative to move machine components such as sheet acceptors, note transports, and sheet storage containers into and away from operative positions.

In an exemplary embodiment, a sheet transport is movably mounted in supporting connection with the ATM housing and extends through an opening in the chest portion. A sheet acceptor is movably mounted within the housing outside the chest portion. Movement of the note acceptor relative to the housing is operative to cause the sheet acceptor to engage and move the sheet transport relative to the opening, wherein when the sheet acceptor and the transport are in engaged relation, the sheet transport is enable to move sheets from the sheet acceptor through the opening and into the interior area of the chest portion.

In an exemplary embodiment, the automated banking machine employs a carriage assembly including a bracket and a carriage structure to align components of the banking machine and retain alignment of the components as they are moved into operative positions. The carriage structure supports a sheet acceptor in a racked position. The carriage structure may include a sheet transport operative to receive sheets from the sheet acceptor and direct them through an opening in the secure chest. The carriage structure is movable between an undocked position and a docked position. When the carriage structure is in the docked position, the sheet acceptor and the sheet storage container are in operative positions so that sheets are enabled to pass through a sheet accepting opening in the chest portion into the sheet storage container.

In the exemplary embodiment, the sheet acceptor may be engaged with the carriage structure in a racked position while the carriage structure is in the undocked position in order to pre-position the components relative each other. Concerted movement of the sheet acceptor and the carriage structure into the docked position maintains alignment of the sheet paths. A movement mechanism, which in some embodiments may include gear members carried on the carriage structure and the sheet acceptor opening, is operative to move the carriage structure between the undocked and docked positions. In an exemplary embodiment, the carriage structure further supports a sheet storage container that may be moved into an operative position with movement of the carriage structure into the docked position.

In an exemplary embodiment, the automated banking machine includes a monitoring mechanism operative to provide audible feedback when the storage container is disposed in the operative position.

In an exemplary embodiment, the sheet acceptor includes a main housing having at least one access opening therein and a cover operative to close the access opening. The cover is adapted to be selectively mounted to a side wall of the housing at either a first mounting site extending along a first edge of the access opening, or a second mounting site extending along a second side of the access opening. When the cover is selectively mounted at the first mounting site, the cover is operative to swing away from the access opening in a first direction, and when the cover is selectively mounted at the second mounting site, the cover is operative to swing away from the access opening in a second direction. Alternately, the cover may be displaced away from the access opening. In an exemplary embodiment, the cover is supported on the housing by a set of tabs which extend through corresponding slots in the cover. To access the interior of the main housing, for example for servicing, the cover may be swung open. Alternately, the cover may be removed by lifting it off the tabs.

In an exemplary embodiment, the automated banking machine includes a removable sheet storage container selectively extending in the interior area, wherein when the sheet storage container is in an operative position, the sheet storage container is operative to receive sheets from the sheet acceptor and deliver the sheets to a storage area within the container. The exemplary embodiment includes a carriage assembly disposed within the interior area for supporting the sheet storage container in the interior area and moving the sheet storage container into and away from the operative position. The exemplary carriage assembly includes a stationary member extending in the interior area, a movable frame, and a frame directing mechanism. The frame directing mechanism directs the frame to move from an out/down position into an in/up position. In the in/up position, the sheet storage container is locked in an operative position by a catch and the frame moving mechanism is prevented from moving. A lever member is operative to unlock the catch holding the storage container in the operative position. In exemplary embodiments, the sheet storage container is locked in the operative position automatically, eliminating the need for a separate manual locking operation. Also in the exemplary embodiments, the frame is biased to automatically move toward the out/down position when the lever member unlocks the sheet storage container.

It should be understood that the features described are exemplary and in other embodiments other approaches may be used which nonetheless employ the features and relationships claimed herein.

BEST MODES FOR CARRYING OUT INVENTION

Figure 1:
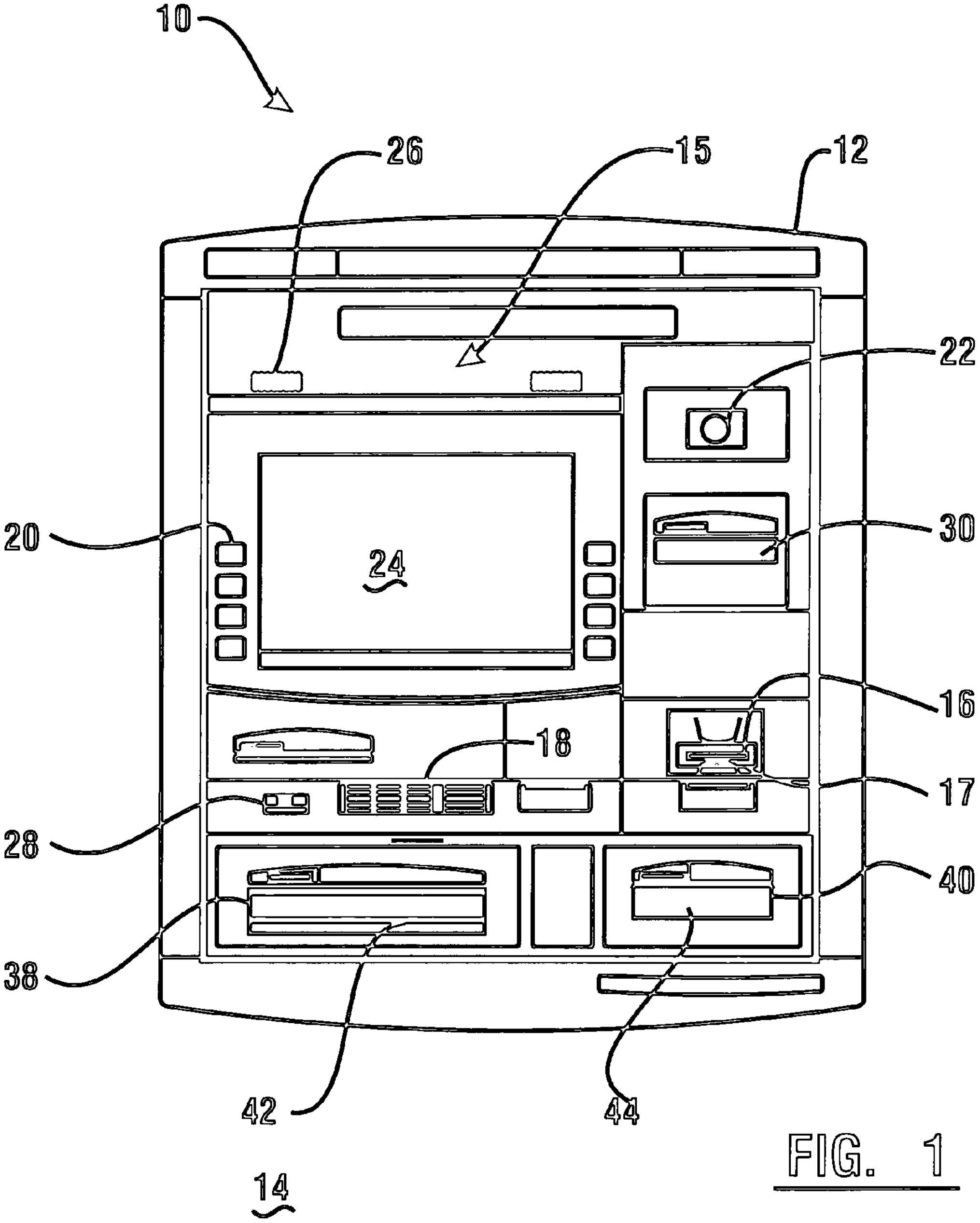
FIG. 1 is a front plan view of an ATM fascia of an automated banking machine of an exemplary embodiment.

Referring now to the drawings and particularly to FIG. 1, there is shown therein a front plan view of an exemplary automated banking machine, which in this embodiment is an automated teller machine ("ATM") 10. In this embodiment, ATM 10 is a through-the-wall type machine which includes a fascia 12. Fascia 12 is accessible to users of the machine who are positioned externally of the wall 14. In some embodiments wall 14 may be an exterior building wall and ATM 10 may be used in a walk-up or drive-up environment. Of course this configuration is merely exemplary and in other embodiments, other types of ATM configurations, such as standalone ATMs, may be used.

The exemplary ATM includes a user interface generally indicated 15. The user interface of the exemplary embodiment includes input devices for receiving inputs from users. These input devices include a card reader 16, a keypad 18, function keys 20 and an imaging device 22. In the exemplary embodiment the input devices may be used for providing identifying inputs such as indicia read from cards, numerical data or biometric data which may be used to identify a particular user of the machine an/or their accounts. In addition the exemplary input devices are also operative to receive transaction inputs which cause the ATM to carry out selected transaction functions. It should be understood that these input devices are exemplary and in other embodiments other types of input devices may be used. The exemplary user interface 15 further includes output devices. The output devices of the exemplary embodiment include a display 24, a speaker 26, and a headphone jack 28. The output devices of the exemplary embodiment are operative to output indicia, either visual, audible or both, which are usable to operate the ATM. Of course the output devices shown in user interface 15 are exemplary and in other embodiments other or additional output devices may be used.

The exemplary ATM 10 further includes other transaction function devices. These transaction function devices include a receipt printer 30 which is operative to provide receipts to users of the machine. As shown in more detail in the interior view of the machine shown in FIG. 2, the receipt printer includes a paper supply 32 which supplies paper on which receipts are printed by a printer mechanism 34. Printed receipts are then transported to the receipt opening the fascia 12 by a transport 36. In exemplary embodiments the receipt printer used may be of the type shown in U.S. Pat. No. 5,850,075, the disclosure of which is incorporated herein by reference. Of course in other embodiments other types of receipt printers may be used.

The exemplary ATM 10 includes on the fascia as shown in FIG. 1, a cash dispensing opening 38 and a cash accepting opening 40. Each of these openings is in operative connection with corresponding transaction function devices, and each has an associated gate mechanism which operates to block access through the opening except at appropriate times during transactions by authorized users. In the exemplary embodiment the cash dispensing opening is shown controlled by a gate 42 and the cash accepting opening is controlled by a gate 44. It should be understood that the fascia and devices associated with ATM 10 are exemplary and in other embodiments other or different fascia configurations and devices may be used.

Figure 2:
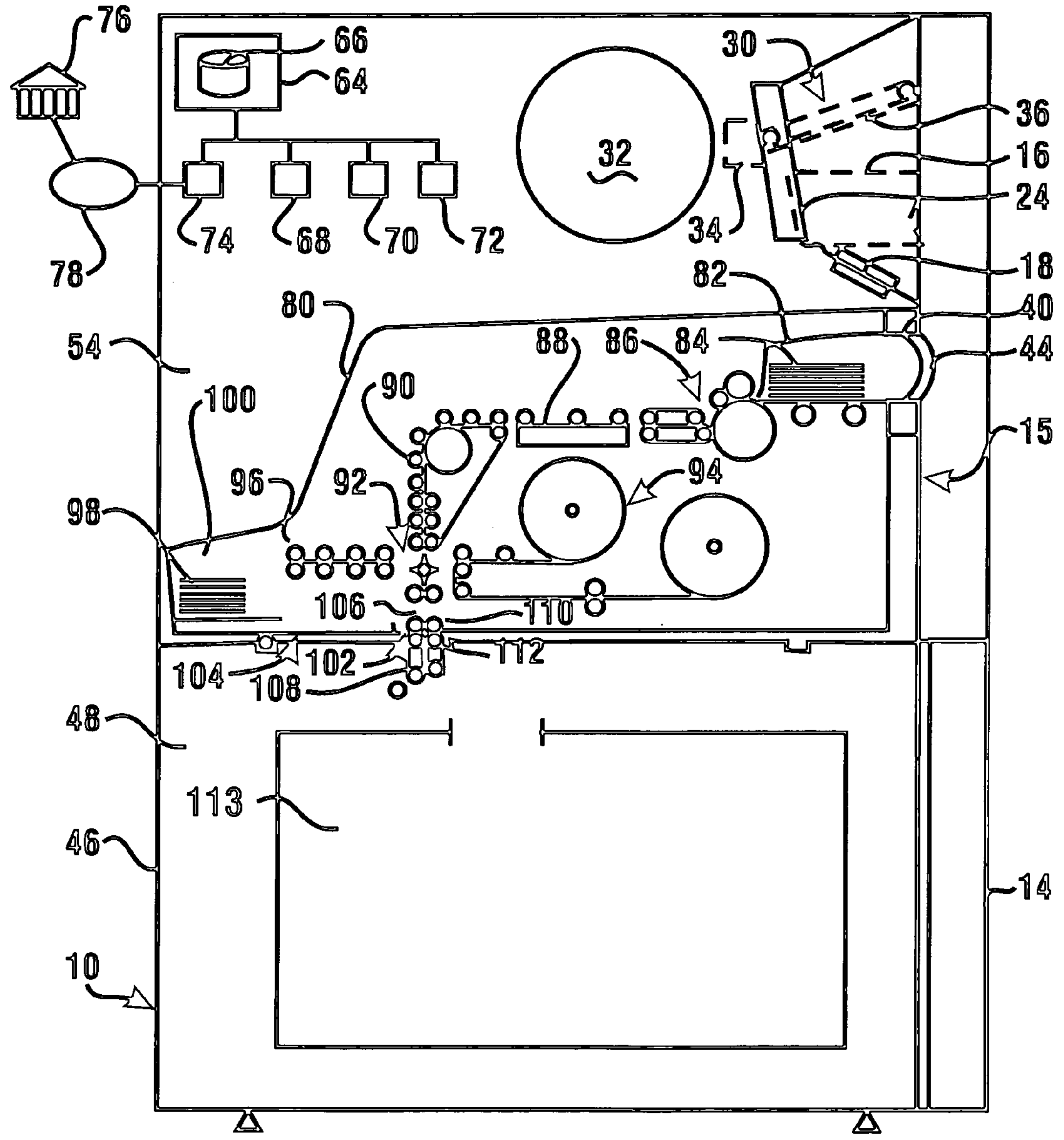
FIG. 2 is a schematic side view of components' within a housing of the ATM shown in FIG. 1.
Figure 3:
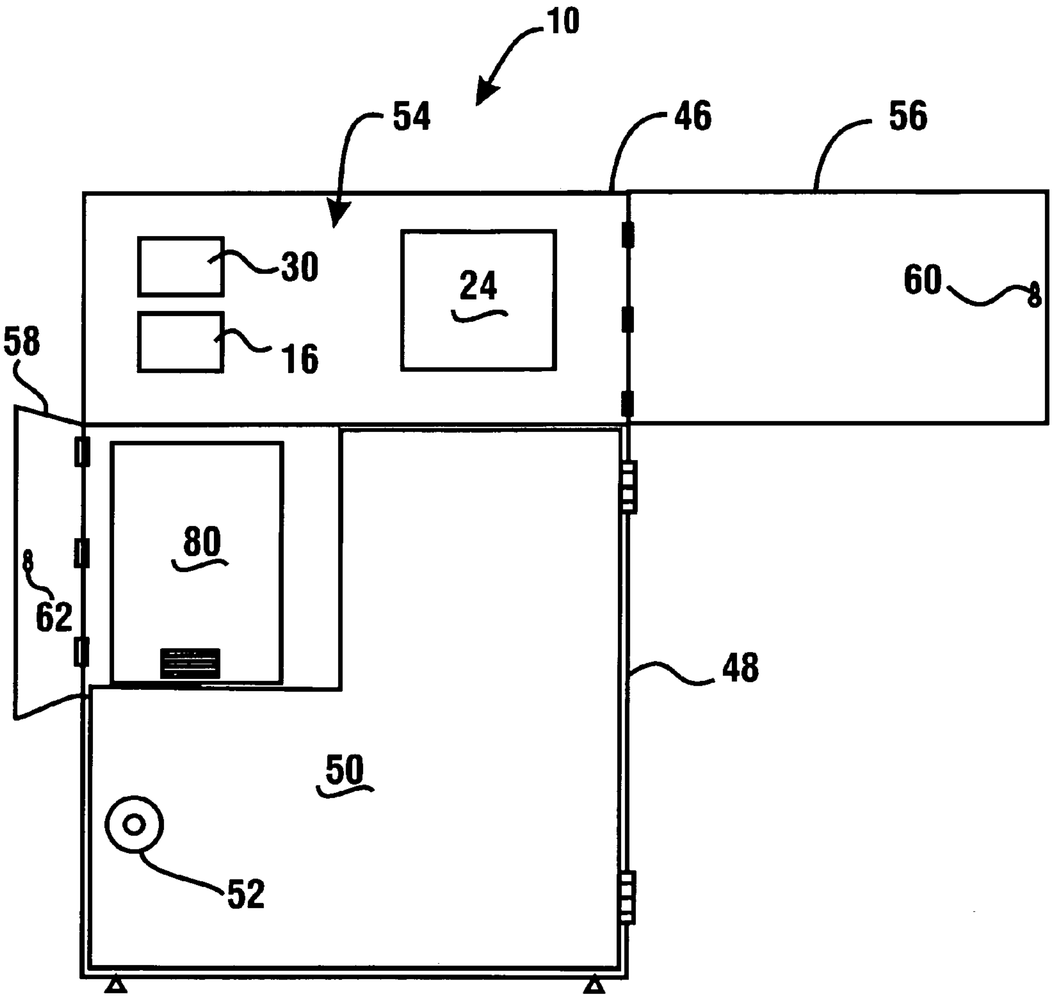
FIG. 3 is a rear view of the housing of the ATM of the exemplary embodiment.

As shown in FIGS. 2 and 3, ATM 10 includes a housing 46. Housing 46 includes a chest portion 48. In the exemplary embodiment chest portion 48 is a generally secure chest which has an access opening and a safe-like access door 50. Access to the interior of the chest portion is limited to authorized personnel through a suitable locking mechanism schematically indicated 52. In an exemplary embodiment the chest is generally L-shaped in cross section, although in other embodiments other configurations may be used.

Housing 46 further includes an upper portion 54. Upper housing portion 54 which is in connection with the fascia, is in supporting connection with the chest portion 48. In the exemplary embodiment upper housing portion 54 has in association therewith, access doors 56 and 58. Access to the upper housing portion is controlled by one or more locking mechanisms in operative connection with access doors 56 and 58 as represented by key locks 60 and 62. In the exemplary embodiment the secure chest portion 48 is used to house financial instrument sheets such as currency notes, checks and other valuable sheets. The upper housing portion 54 is generally used to house components of the machine that do not hold on an extended basis, notes or other financial instrument documents which can be redeemed for value. Of course it should be understood that the construction of ATM 10 is exemplary and in other embodiments other approaches may be used.

As schematically shown in FIG. 2, ATM 10 includes at least one controller schematically indicated 64. In the exemplary embodiment controller 64 includes at least one processor and is in operative connection with at least one data store schematically indicated 66. In the exemplary embodiment the data store is operative to hold data representative of instructions such as computer programs, configuration parameters, data about transactions conducted and other information that may be usable in the operation of the ATM 10. Computer executable instructions executed by the one or more controllers may be resident on and/or loaded from articles suitable for holding such computer executable instruction. Such articles may include hard disk drives, floppy disks, flash memory, CD ROMs, PROMs, or other articles from which a computer can read and execute instructions.

Controller 64 is in operative connection with numerous transaction function devices within the ATM, and is operative to control the operation thereof in accordance with its programming. Controller 64 is shown schematically in operative connection with devices 68, 70, and 72. It should be understood that this representation is schematic only and is intended merely to represent numerous components within the machine which are in operative connection with the controller. For example the transaction function devices may include moving devices which may be referred to alternately herein as drives, such as motors, solenoids, and other devices that are operative to impart motion to components. Likewise transaction function devices may include sensors such as radiation sensors, proximity sensors, switches and other types of sensors that are operative to sense items, users, conditions, properties, characteristics, or components within the ATM and to enable a controller to perform functions in accordance with its programming. Transaction function devices include output devices such as sound emitters and light emitting devices. For example, and without limitation, transaction function devices may include the card reader, display, keyboard, function keys, printer, cash dispenser, cash acceptor, storage mechanisms and other devices previously discussed as well as other devices within the machine which are operative in response to the controller.

In the exemplary embodiment the controller is also in operative connection with a communications device schematically indicated 74. The communications device is operative to communicate messages electronically between the ATM 10 and other computers in financial transaction processing systems. These may include for example communications with systems operated by banks, credit card networks, automated clearinghouses, and other entities. In FIG. 2 the communications device 74 in the ATM 10 is schematically shown as providing communication with a financial institution 76 through a network 78. It should be understood that this communication configuration is exemplary and in other embodiments other communication arrangements may be used. U.S. Pat. No. 6,505,177 also shows an exemplary communication system for an ATM and the disclosure thereof is incorporated herein by reference. Embodiments may include features of U.S. Pat. Nos. 6,705,517; 6,672,505; and 6,598,023, the disclosures of which are incorporated herein by reference.

In the operative position of ATM 10, the housing 46 houses a sheet acceptor 80 which is also referred to herein as a cash acceptor. In the exemplary embodiment, the sheet acceptor 80 is operative to accept sheets from a machine user through the cash accepting opening 40, to analyze each sheet for at least one property or characteristic, and to route the sheets selectively for storage within the housing of the machine based on the characteristics analyzed. It should be understood that in various embodiments the term "sheet" may include currency notes, checks, or other financial instrument sheets. It should further be understood that in exemplary embodiments the financial instrument sheets may be sheets comprised of different types of material such as paper, plastic, or combinations thereof. It should further be understood that references herein to a sheet acceptor will be deemed to encompass mechanisms which handle not only currency notes, but also other financial instrument sheets such as checks, money orders, gift certificates, vouchers, etc.

As represented in FIG. 2, sheet acceptor 80 includes a chute 82 which extends through cash accepting opening 40 in fascia 15 in its operative condition. The user accessible opening to chute 82 is controlled by a movable gate 44. Gate 44 moves responsive to the controller 64 and enables authorized users to access the chute at appropriate times during transaction sequences.

In operation of the machine users are enabled to insert a stack of financial instrument sheets schematically indicated 84, into the chute. The stack 84 may comprise currency notes, checks or other forms of financial sheets.

In an exemplary embodiment, in operation of the sheet acceptor, sheets are individually separated from the stack by a picker mechanism 86. Each picked sheet is transported individually from the picker mechanism past a validator device schematically indicated 88. The picker mechanism may be of the type shown in U.S. Pat. No. 6,874,682, the disclosure of which is incorporated herein by reference. Other mechanisms and devices operative to individually separate sheets from a stack may be utilized within the scope of the invention.

The validator device 88 is operative to determine at least one characteristic of each sheet. This may include for example, devices which sense for one or more characteristics of valid notes or other valid sheets of the type to be analyzed. Exemplary embodiments of the validating device may be of the type shown in U.S. Pat. No. 5,923,415 and U.S. Pat. No. 6,554,185, the disclosures of which is incorporated herein by reference. In other embodiments other types of validating devices such as imagers, readers, sensors, and combinations thereof may be used. In other embodiments the sheet accepting device may include features for imaging and analyzing checks, bills, vouchers or other sheets and may include features described in U.S. patent application Ser. No. 11/370,525 filed Mar. 8, 2006 the disclosure of which is incorporated herein by reference.

In the exemplary embodiment of the sheet acceptor 80, sheets which have been analyzed through operation of the validator device 88 are moved through a transport 90 to a routing device 92. The routing device is operative responsive to the controller 64 to route sheets selectively to either an escrow device 94 or a transport 96. Escrow device 94 generally operates to hold sheets in storage on a temporary basis. Such an escrow device may be of the type shown in U.S. Pat. No. 6,371,368, the disclosure of which is incorporated by reference herein. Escrow device 94 may be operative to accept sheets and store them. Thereafter responsive to operation of the controller 64 the escrow device may deliver those sheets to the routing device 92 which directs them along sheet paths in the machine to carry out transactions. The escrow device shown is exemplary and in other embodiments other types of escrow devices may be used.

In the exemplary embodiment transport 96 is used to receive unacceptable sheets which have characteristics that do not satisfy certain parameters set by the machine or are otherwise deemed unacceptable. As schematically represented, sheet acceptor 80 is operated to cause transport 96 to deposit suspect sheets schematically indicated 98 into a storage area 100. In the exemplary embodiment the suspect sheets are stored within the sheet acceptor 80 and outside of the secure chest 50 so that they may be recovered by servicing personnel.

In the exemplary embodiment the sheet acceptor 80 is operative responsive to signals from the controller 64 to cause financial instrument sheets that are determined to be valid or otherwise acceptable, to be directed through a cash or sheet accepting opening 102 that extends in an upper surface 104 of the chest.

In this exemplary embodiment, a transport 106 in the sheet acceptor 80 is aligned with the cash accepting opening 102 and a transport 108 that extends into the secure chest 50. As schematically represented, at least one driving member 110 of the transport 106 is in operative connection with a driven member 112 of the transport 108. In the exemplary embodiment, this arrangement enables the sheet acceptor 80 to transmit movement to other mechanisms within the secure chest and to assure coordinated movement of processed sheets therein. Further, in the exemplary embodiment the driving and driven members extend in the cash accepting opening so as to block access therethrough by unauthorized persons.

In the exemplary embodiment, after sheets pass into the secure chest, they may be acted upon by various mechanisms and devices which allow storage of the sheets at a storage site, schematically designated 113 in FIG. 2. The storage site 113 may further include mechanisms and devices that separate and/or stack the sheets for storage or distribution. In alternate embodiments, the sheets may be directed to a bulk storage site for later collection. In still other alternative embodiments the sheets may be directed to mechanisms from which they can be later dispensed and "recycled" by the machine.

Figure 4:
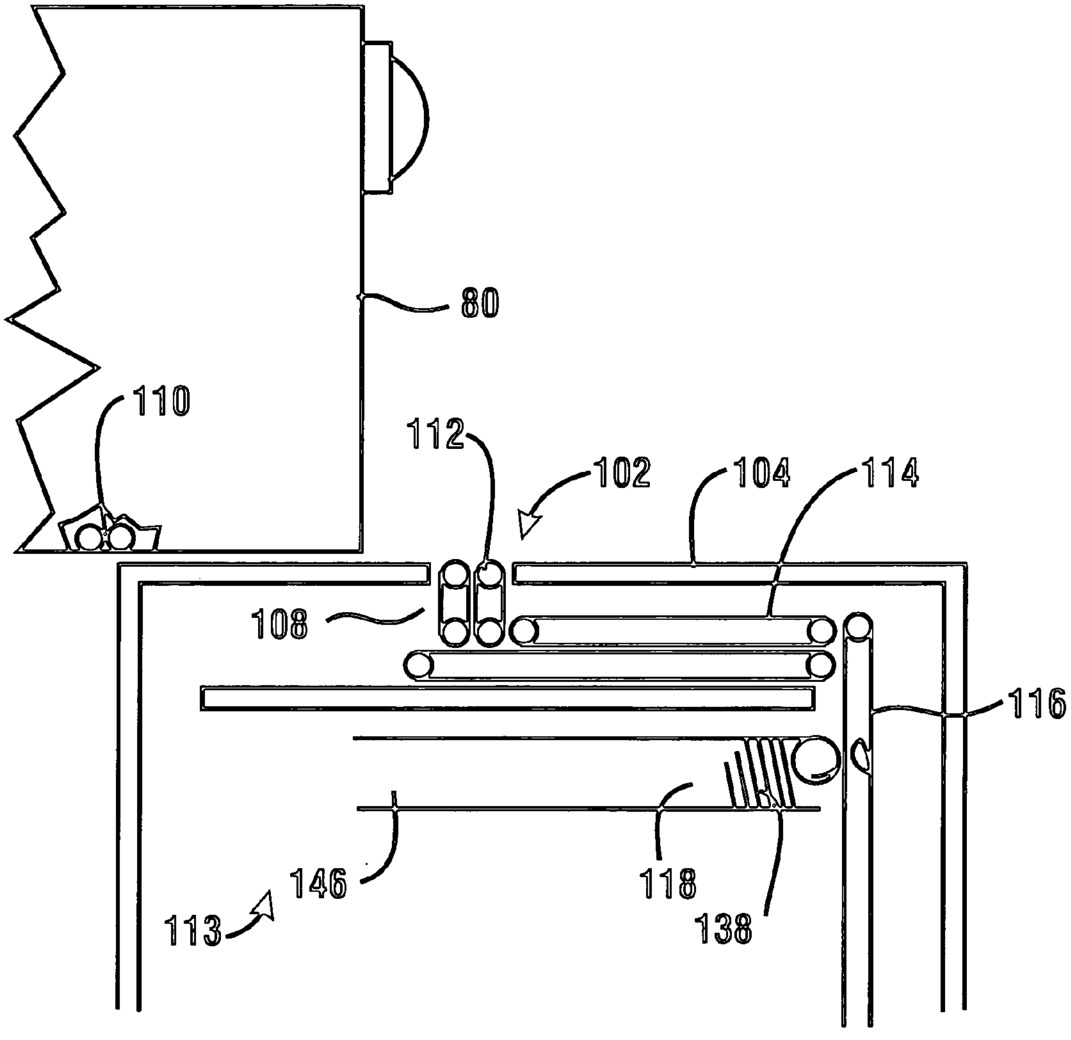
FIG. 4 is a partial schematic side view of components within a housing of an exemplary ATM.

In an exemplary embodiment, the sheet acceptor 80 is provided as a modular unit that may be moved from the operative position shown in FIG. 2 to a servicing position, shown schematically in FIG. 4. In the exemplary embodiment, when the sheet acceptor 80 is moved from the operative position shown in FIG. 2 to a servicing position, the driving member 110 and the driven member 112 disengage. In some exemplary embodiments the movement of the sheet acceptor from the operative position to a servicing position may include movably mounting the sheet acceptor such that the sheet acceptor moves both upwardly away from the secure chest so as to disengage the driving and driven members as well as outwardly for purposes of servicing. To return the sheet acceptor to the operative position, movement thereof is made both inwardly and downwardly so as to re-engage the driving and driven members. The movement of the sheet acceptor may be accomplished by a combination of slides, rollers or other suitable mechanisms. The approach described of providing for engagement between the sheet acceptor and a mechanism for handling sheets within the secure chest is exemplary and in other embodiments other approaches may be used, or the transport within the secure chest may have a separate motor or other moving device. With reference to FIG. 4, the sheet storage site 113 may include various transports 114, 116 and sheet handling mechanisms 118 to direct movement of notes to a note storage mechanism 146. In exemplary embodiments, the note storage mechanism 146 may be operative to return notes to circulation to users of the machine.

Figure 5:
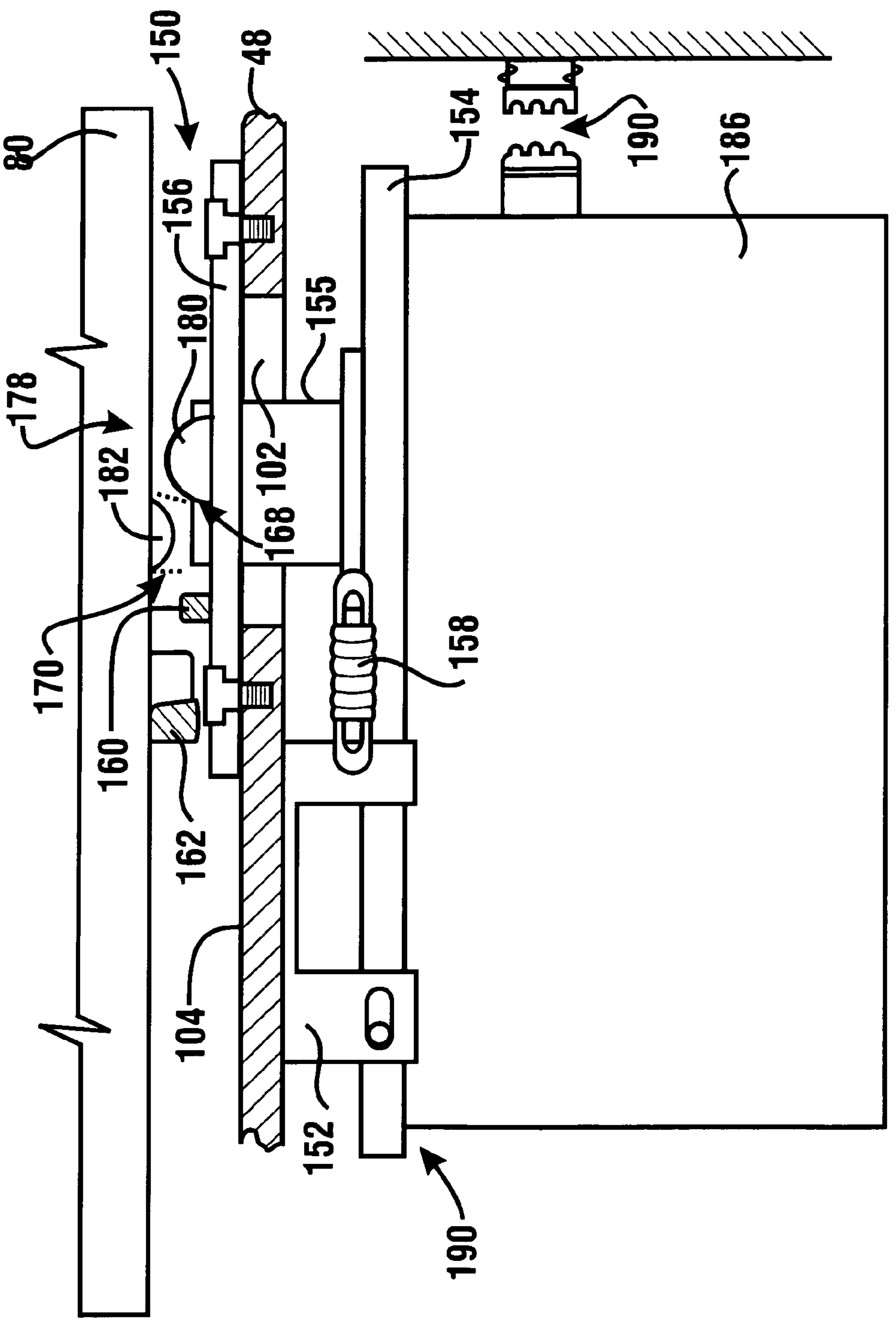
FIG. 5 is a partial side schematic view of components within a housing of an exemplary ATM, illustrating a sheet acceptor in an unracked position relative a note transport.
Figure 6:
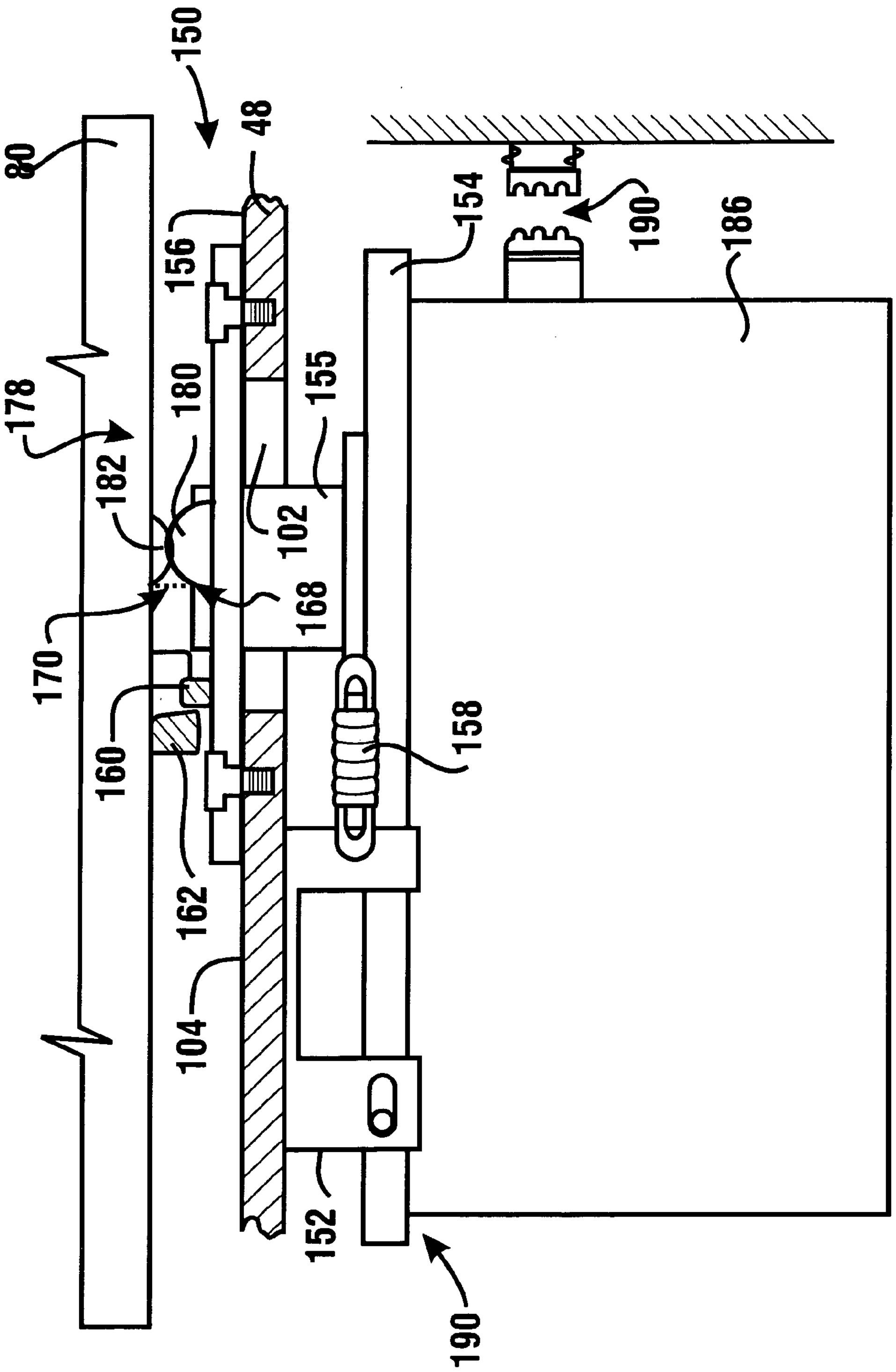
FIG. 6 is a partial side schematic view of components within a housing of the exemplary ATM shown in FIG. 5, illustrating a sheet acceptor in a racked position relative a note transport.
Figure 7:
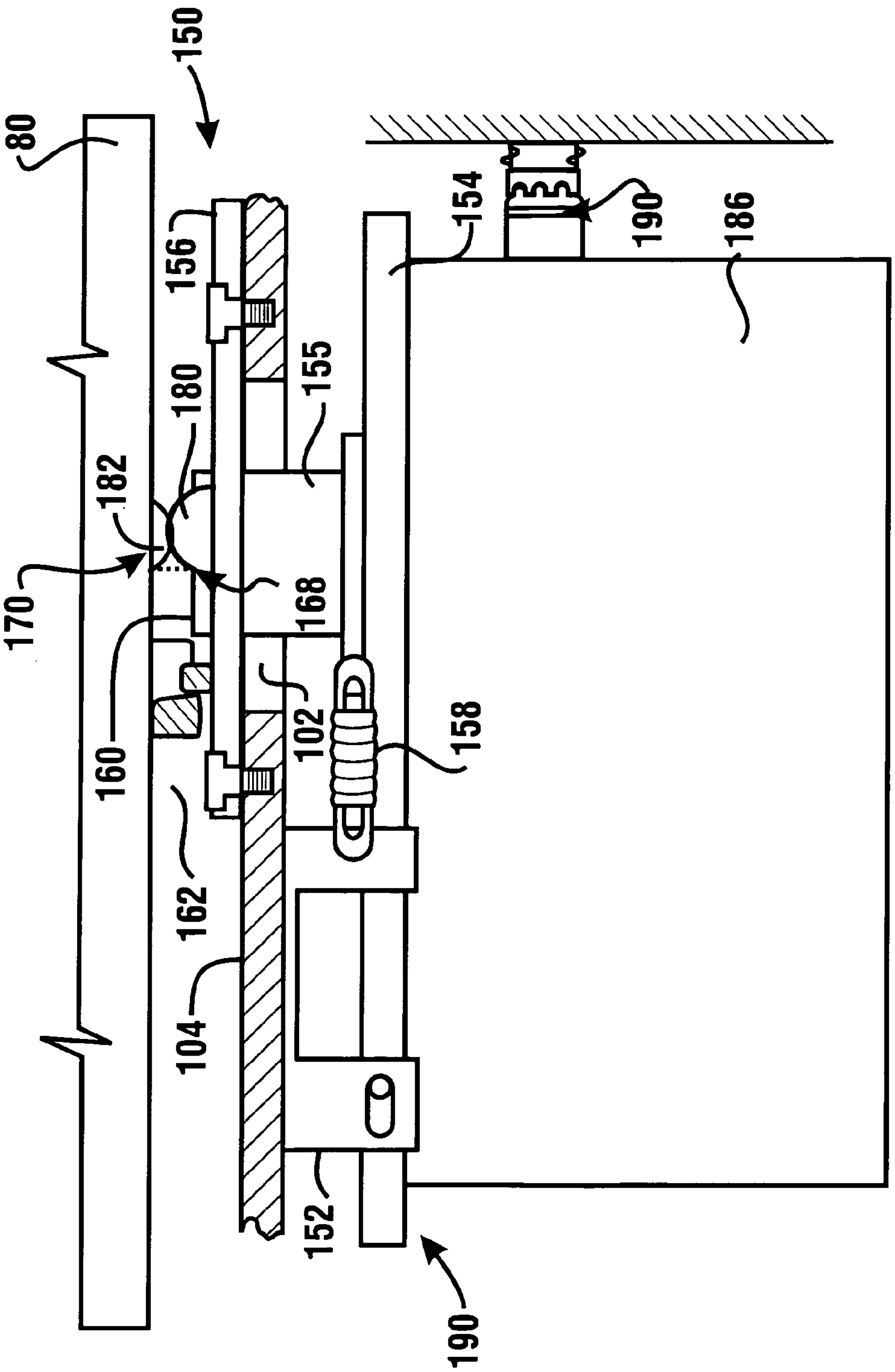
FIG. 7 is a partial side schematic view of components within a housing of the exemplary ATM shown in FIGS. 5 and 6, illustrating a sheet acceptor and a note transport in a docked (operative) position.
Figure 8:
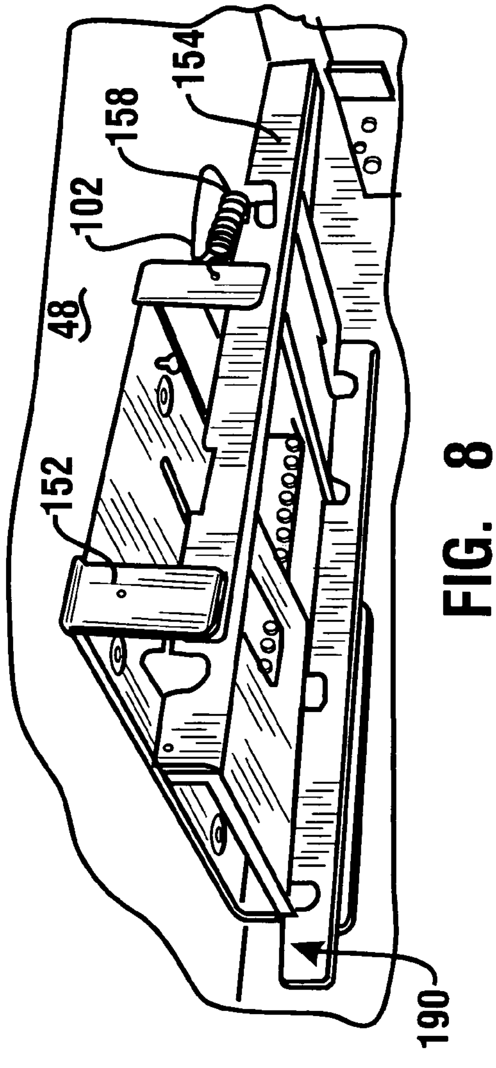
FIG. 8 is an isometric view of an exemplary carriage assembly as viewed from an interior of a secure chest portion.
Figure 9:
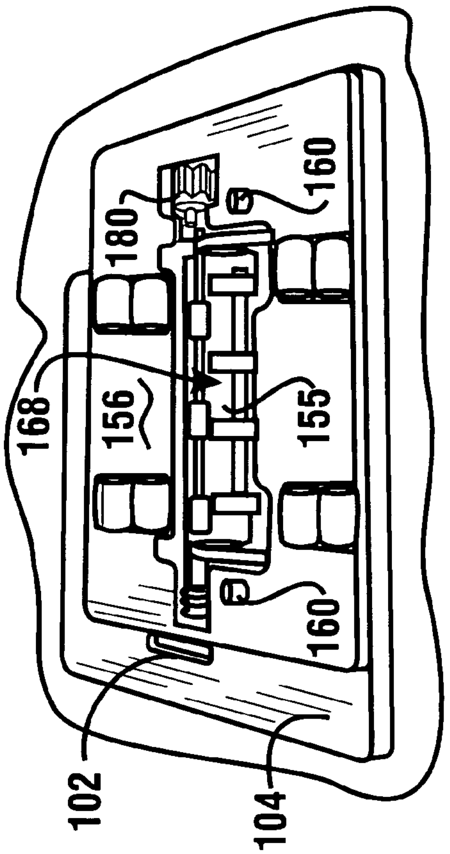
FIG. 9 is a partial perspective view of the exemplary carriage assembly of FIG. 8 as viewed from an exterior of a secure chest portion.
Figure 10:
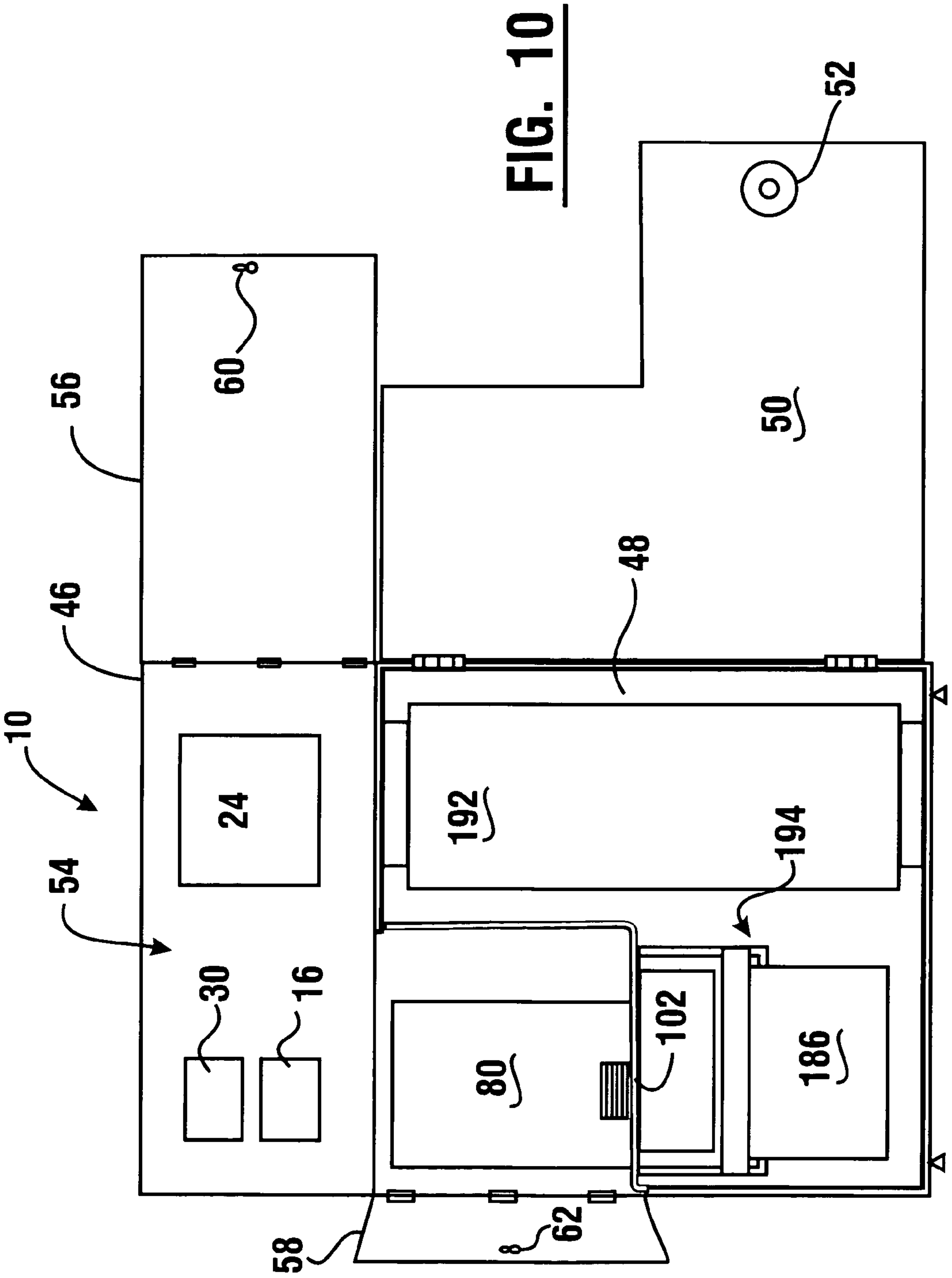
FIG. 10 is a schematic back view of an exemplary ATM in which various access doors are illustrated in an open condition.

With reference to FIGS. 5-9, an exemplary embodiment of an ATM is shown. The exemplary ATM may include any of the previously described features and components such as a user interface, input devices, output devices, displays, controllers and processors, communication devices, note dispensers, validating devices, imaging devices, and the like, all not shown in these views. In the exemplary embodiment, a sheet acceptor 80 is movably mounted relative to and in supporting connection with the ATM housing. The sheet acceptor 80 is operative to engage a carriage assembly 150 operative to support the sheet acceptor 80 and to guide movement of the sheet acceptor into the operative position. The carriage assembly 150 includes a bracket member 152 which, in this embodiment, remains stationary with respect to the secure chest 48 and extends into the interior area of secure chest 48. A carriage structure 154 is supported by bracket member 152, in movable relationship with respect to the secure chest 48. When the carriage structure 154 is in a first predetermined position relative the secure chest 48, the carriage structure is said to be in an "undocked" position (FIGS. 5 and 6). When the carriage structure 154 is in a second predetermined position relative the secure chest 48, the carriage structure is said to be in a "docked" position (FIG. 7).

In the exemplary embodiment, a sheet transport 155 is mounted in supporting connection with the carriage structure 154 so as to be movable therewith. The sheet transport 155 extends in the sheet accepting opening 102, is movable therein, and is operative to receive sheets from the sheet acceptor 80 and to pass them into the interior area of the secure chest.

In the exemplary embodiment, the carriage assembly also includes a biasing member which in the exemplary embodiment comprises a spring 158 extending between the bracket member 152 and the carriage structure 154. The biasing member is operative to urge the carriage structure away from the docked position so that when the sheet acceptor 80 is moved away from operative engagement with the carriage structure, the carriage structure will automatically move away from the docked position. One exemplary construction of the carriage assembly is shown in the Figures. Embodiments are not limited to the arrangement of parts shown, but also encompass other constructions having biasing members and devices that operate to urge the carriage structure away from the docked position upon disengagement of the sheet acceptor.

The sheet acceptor 80 may be mounted in operative supporting engagement with the carriage structure 154, herein referred to as a "racked" position (FIG. 6). When the sheet acceptor 80 is in the racked position, the carriage structure and the sheet acceptor 80 are adapted for coordinated movement, and the sheet transport 155 is in operative alignment with the sheet acceptor. Movement of the carriage structure 154 into the "docked" position is operative to move the sheet acceptor into the operative position relative the secure chest such that sheets from the sheet acceptor are enabled to be passed into the interior area of the secure chest.

In this exemplary embodiment, the carriage structure includes a plate member 156 which is movably mounted in a slidable relationship relative to an upper surface 104 of secure chest 48. Plate member 156 may include one or more docking pins 160 extending therefrom. In this exemplary embodiment, one or more docking feet 162 are adapted for operative engagement with docking pins 160 carried on the sheet acceptor 80. Of course, other constructions that enable the sheet acceptor 80 to be initially aligned with a carriage structure to enable coordinated movement therewith, may be used in alternative embodiments. For example, other types of interlocking members may be used.

In the exemplary embodiment, the sheet transport 155 defines a first sheet path 168 traveled by sheets passing through the sheet accepting opening 102. In the exemplary embodiment, the sheet acceptor 80 defines a second sheet path 170 traveled by sheets moving toward the sheet accepting opening. When the sheet acceptor 80 is in the racked position relative the carriage structure 154, the second sheet path 170 is substantially aligned with the first sheet path 168, as shown in FIG. 6. As the carriage structure moves into the docked position, the first and second sheet paths remained aligned.

In the exemplary embodiment, the ATM includes a carriage movement mechanism, generally denoted 178. When the sheet acceptor is in operative engagement with the carriage structure, i.e., in the racked position, the carriage movement mechanism is operative to move the sheet acceptor 80 in concerted movement with the sheet transport 155 toward the docked position. In the exemplary embodiment, the carriage movement mechanism retains the first and second sheet paths in substantial alignment as the sheet transport 155, with the sheet acceptor 80, is moved relative to carriage structure 154.

In an exemplary embodiment, the carriage movement mechanism 178 includes a first gear member 180 operatively supported on the carriage structure 154 adjacent the first sheet path 168 and a second gear member 182 operatively on the sheet acceptor 80 adjacent the second sheet path 170. When the sheet acceptor 80 is in the racked position, the first and second gear members are adapted for operative engagement. In some embodiments either the first gear member or the second gear member may act as a drive gear whereby the other gear is a driven gear. In the exemplary embodiment shown, rotation of the drive gear is operative to cause relative movement of the carriage structure, and the concerted movement of the sheet acceptor 80, into the docked position. The illustrated carriage movement mechanism 178 is merely exemplary and other means operative to move carriage structure 154 into the docked position are contemplated. For example, other driver means and/or biasing members may be employed to move the carriage structure 154 after the sheet acceptor 80 is operatively engaged with the note transport 155.

When the carriage structure is in the docked position, the previously aligned first and second sheet paths are placed into an operative position and are enabled to selectively pass sheets through the sheet accepting opening 102 and into the interior area of chest portion 48.

The exemplary embodiment includes a sheet storage container 186 extending in the interior area of chest portion 48. Exemplary storage containers 186 may be movable within the interior of the chest portion 48 and/or selectively removable from the machine. The sheet storage container which may be a so-called free-fall or bulk storage container, or a stacking cassette. In either case, the sheet storage container 186 is operative to receive sheets that pass through the sheet accepting opening.

In the exemplary embodiment, sheet storage container 186 is adapted for mounting on the carriage structure 154 which serves as a mount, at a mounting site 190. In the exemplary embodiment, the mounting site may include one or more rails or support structures adapted to selectively engage the storage container 186. In the exemplary embodiment, the container is movable in engaged relation with the carriage structure and appropriate stops and alignment mechanisms may be used to position the storage container 186 in relation to the carriage structure 154.

In the exemplary embodiment, the sheet storage container 186 is adapted for coordinated movement with the carriage structure, so that as the carriage structure is moved into the docked position, the sheet storage container is moved into an operative position in which the container is able to receive sheets passing through the sheet accepting opening. Thus, the sheet acceptor, the sheet transport, and the storage container may be "pre-aligned" prior to concerted movement with the carriage structure 154 into the docked position.

In the exemplary embodiment, the sheet storage container 186 may include one or more cassettes operative to receive currency notes that pass through the sheet accepting opening and store them in the interior of the chest portion in stacked relation and/or according to note denomination. In some exemplary embodiments, the ATM may be operable to recycle currency by preparing received notes to be returned to the same or subsequent machine users. In such embodiments, the one or more stacking cassettes may be operatively connected with a note dispensing mechanism. Examples of sheet accepting and stacking mechanisms as well as sheet accepting, stacking, and dispensing mechanisms which may be used in some exemplary embodiments are described in detail in U.S. Pat. Nos. 6,302,393 and 6,209,070, the disclosures of each of which are incorporated herein by reference.

In the exemplary embodiment, it is desirable to maintain the interior components of the sheet acceptor 80 generally isolated and in sealed relation except when access is required for servicing. With reference to FIG. 3, in the exemplary embodiment, the ATM 10 may be a "rear-load" ATM such that access for servicing and accessing the sheet acceptor is provided through access door 58. In this exemplary embodiment, the "undocked" position of the carriage structure 154 is disposed generally rearwardly of the "docked" position so that movement of the carriage structure from the undocked position into the docked position entails moving the carriage structure toward a front of the machine.

In exemplary embodiments, the ATM may include one or more monitoring mechanisms 190 to indicate whether certain movable components have been moved to an operative position. An exemplary monitoring mechanism includes one or more sensors in operative connection with an audible output device. The output device is operative to provide an audible output, such as a beeping noise. The monitoring mechanism may be used, for example, on embodiments of ATMs having movable sheet storage containers to indicate that the sheet storage container has moved so as to be properly positioned in the operative position. Of course other types of indications of proper positioning can be used such as visual or vibratory indicators. The monitoring mechanism may comprise a stand-alone circuit card assembly in operative connection with one or more sensing devices. Alternatively, such monitoring capability may be an integral part of other ATM circuitry. This arrangement is merely exemplary and other means of providing audible, visual or other user feedback upon proper positioning of movable components are provided within the scope of the invention. As should be apparent, the monitoring mechanisms can be used with free-fall sheet storage containers or with stacking cassettes depending on the particular application. It is further desirable in some embodiments to provide such audible feedback mechanisms on ATMs having movable sheet acceptors so that proper positioning can be monitored.

In an exemplary embodiment, the sheet acceptor 80 may be moved relative the ATM housing to extend outwardly from the ATM housing through opening access door 58, without accessing the interior area of chest portion 48 through chest door 50 (see FIG. 3). To place the sheet acceptor 80 into an operative position, the sheet acceptor is moved relative to and in supporting connection with the chest portion of the ATM. The docking feet 162 carried on the sheet acceptor 80 are relatively moved to engage the docking pins 160 carried on the carriage structure so that the sheet acceptor is in operative engagement with the sheet transport 155. The sheet transport and the sheet acceptor 80 are moved in concerted movement to a docked position wherein sheets are enabled to pass from the sheet acceptor 80 to the sheet transport.

In an exemplary embodiment when the sheet acceptor is moved into proximity to the docked position, a driving gear 182 carried on the sheet acceptor 80 is operative to engage a gear member 180 carried on the carriage structure adjacent the sheet transport. Operation of the driving gear causes the concerted movement of the sheet acceptor 80 and the sheet transport relative to the chest portion. In an exemplary embodiment, a sheet storage container may be mounted onto the carriage structure 154 so that operation of the driving gear causes concerted movement of the sheet storage container 186 with the movement of the sheet acceptor 80 and the sheet transport 155. This may be accomplished for example, through operation of a processor which operates responsive to signals from a sensor or other input device, which is used to sense or indicate that the sheet acceptor and carriage are in proximity to the docked position. The processor may operate responsive to such signals to cause operation of at least one drive to move a driving gear until the sheet acceptor and carriage move to the docked position. Of course, this approach is merely exemplary.

With reference to FIGS. 10-13, in an exemplary embodiment, an ATM 10 includes a housing 46 having a secure chest portion 48 having a sheet accepting opening 102 in a wall thereof providing access to an interior area of the chest portion 48. The exemplary ATM may include a note dispenser, schematically represented as 190, adapted to dispense notes stored in the interior area to users of the machine. The exemplary ATM includes a sheet acceptor 80 movably mounted within and in supporting connection with the housing outside the chest portion 48. When the sheet acceptor 80 is in an operative position, the sheet acceptor is operative to receive sheets input to the machine and to pass sheets through the sheet accepting opening 102 into the interior area of the chest portion. In exemplary embodiments, the sheet acceptor 80 is further operative to separate sheets from a stack, validate sheets, image sheets, and/or segregate valid sheets from invalid sheets. The sheet acceptor 80 may be further operative to store invalid sheets in a sheet storage location and pass the valid sheets to the interior area of the chest portion 48.

The exemplary embodiment includes a sheet storage container 186 extending in the interior area. In the exemplary embodiment, the sheet storage container is movably mounted within and in supporting connection with the chest portion. The sheet storage container is movable into an operative position in order to receive notes from the sheet acceptor 80 and deliver the sheets to a storage area within the container.

Figure 11:
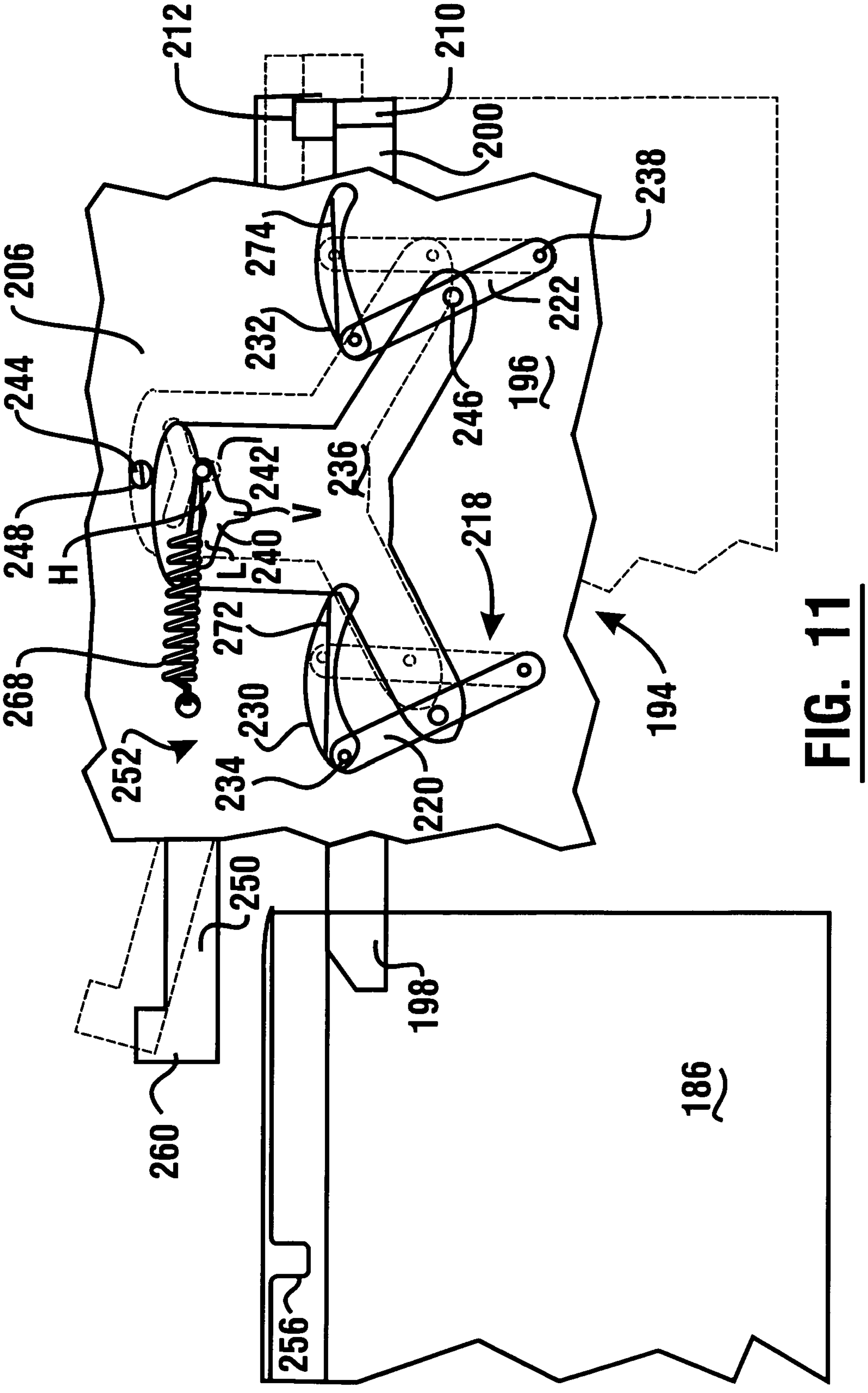
FIG. 11 is a partial side schematic view of components within a housing of an exemplary ATM illustrating a movable sheet storage container.
Figure 13:
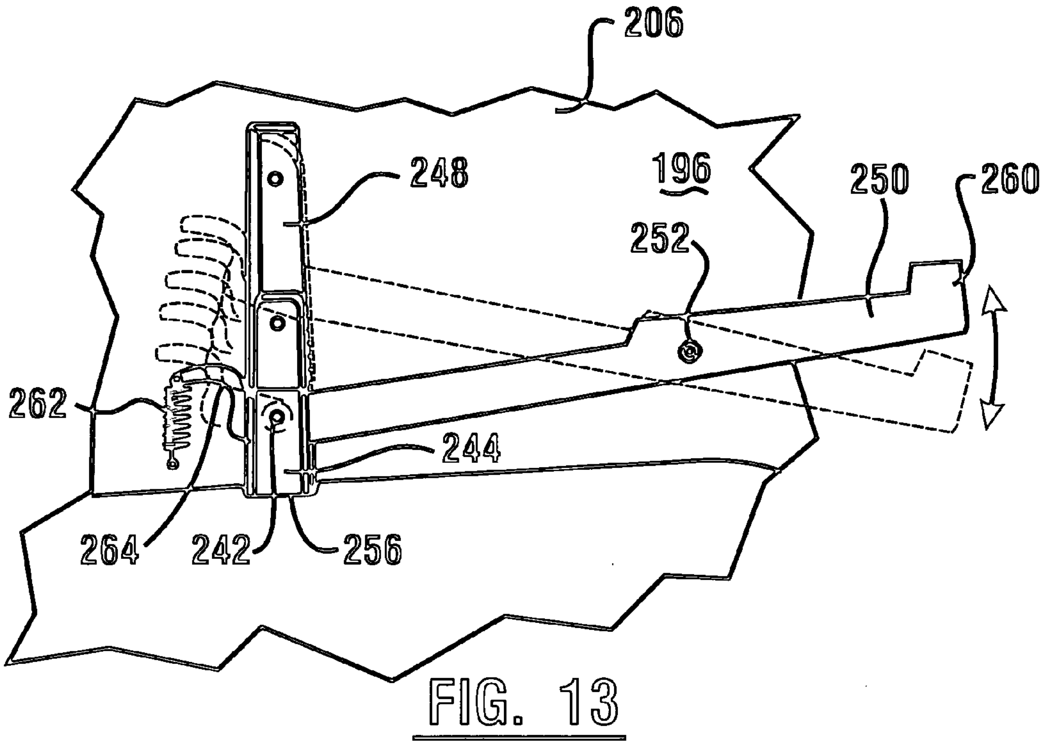
FIG. 13 is a partial isometric view of the carriage assembly shown in FIG. 12 taken from an internal side.
Figure 12:
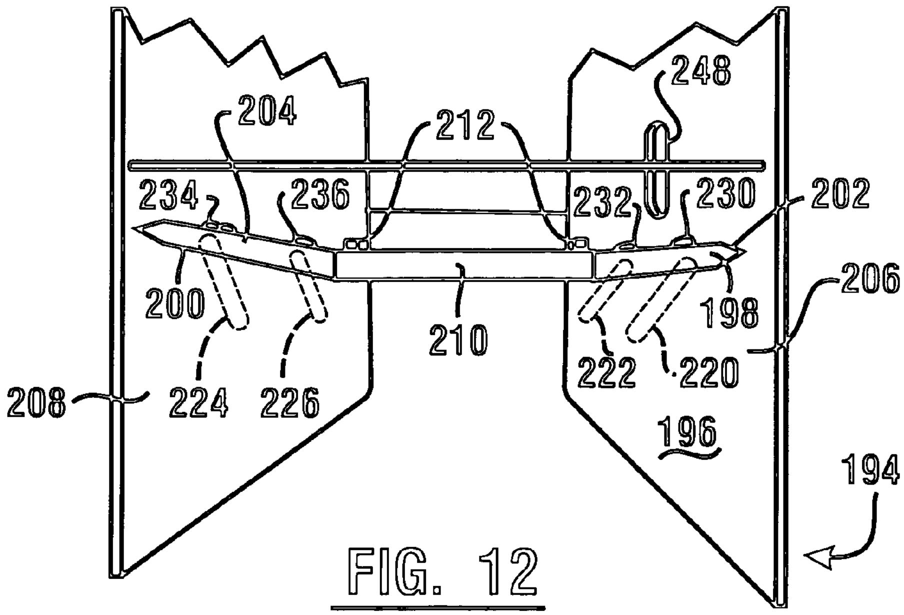
FIG. 12 is a partial perspective view of a carriage assembly for movably mounting the sheet storage container shown in FIG. 11.

In an exemplary embodiment, the ATM includes a mount, which includes a carriage assembly 194 disposed within the interior area to support the sheet storage container and move it into and away from the operative position. With reference to FIGS. 11-13, the exemplary carriage assembly 194 includes a stationary member 196 extending in the interior area. A movable frame 198 adapted to selectively engage the sheet storage container 186 is mounted in supporting connection with the stationary member. In the exemplary embodiment, the movable frame 198 comprises a U-shaped body 200 including a pair of legs 202, 204 each extending adjacent one of the opposite planar sides 206, 208 of the stationary member and a transverse member. The sides bound a container holding area. In the exemplary embodiment, the frame 198 includes devices such as stop pins 212 to facilitate proper positioning of the sheet storage container. The frame 198 is operative to move relative to the stationary member between an out/down position and an in/up position (shown in phantom in FIG. 11). When the frame 198 is in the in/up position, the storage container supported thereon is in the operative position. When the frame 198 is in the down/out position, the storage container is in a release position and may be disengaged from the frame, removed and/or replaced. A container may also be engaged with the frame in the release position. The frame 198 is movable between the down/out position and the in/up position by operation of a frame directing mechanism, generally denoted 218, mounted in supporting connection with the stationary member.

The exemplary frame directing mechanism 218 directs movement of the frame and includes a pair of spaced first arm members 220, 222 mounted in pivotable connection with the first side 206 of the stationary member 196 and in operative connection with the first leg 202 of the movable frame 198. The first arm members 220, 222 are operative to pivot in coordinated movement in a first manner to direct the frame 198 responsive to inward force into the in/up position. The first arm members are operative to pivot in coordinated movement in a second manner to move the frame 198 into the down/out position. In the exemplary embodiment, a pair of spaced second arms 224, 226 (shown in phantom in FIG. 12) are mounted in pivotable connection with the second planar side 208 of the stationary member 196 and in operative connection with the second leg 204 of the movable frame 198. Each arm member is mounted in rotatable supporting connection with the stationary member adjacent its lower end through a pin 228 or other mounting structure enabling rotation of the arm member.

Each of the first arm members are pivotally movable with a member attached to an upper end thereof such as a pin 234, within a pair of spaced first arcuate slots 230, 232 in the first planar side 206 of the stationary member 196. In the exemplary embodiment, the first arm members are disposed substantially externally of the first side of the stationary member and the movable frame 198 is disposed internally of the first side. The second arm members 224, 226 are likewise pivotally movable such that a pin member 234 attached to an upper end thereof is movable within a pair of spaced second arcuate slots 234, 236 in the second side 208 of the stationary member 196 and are disposed substantially externally of the second planar side 208 of the stationary member 196. Each of the pin members 234 attached adjacent to the upper end of each arm is in operative connection with the frame 198.

With particular reference to FIG. 11, when the frame 198 is in the out/down position, a sheet storage container may be operatively supported thereon in an unmounted position. The sheet storage container 186 may be moved inwardly, relative to the frame 198, until the transverse member 210 disposed at the internal end of the frame 198 is engaged by the container. At this point, the sheet storage container 186 occupies a mounted position relative the frame 198 and is in the release position. Further inward movement of the sheet storage container is associated with operation of the frame directing mechanism 218. Each of the first arm members 220, 222 which are operatively connected to the frame through the pin members 234 adjacent to the upper ends thereof, pivots about its respective pivot axis at the lower end about pins 238 so that frame 198 is moved to the in/up operative position, shown in phantom. The sheet storage container then occupies the operative position where it is operative to receive sheets passing through the sheet accepting opening in the chest portion. In the exemplary embodiment, the sheet storage container is moved inwardly responsive to a manually applied force. In other embodiments, other means of exerting a force against the sheet storage container may be utilized. This may include a motor, solenoid or other drive, for example.

A plate member 236 is mounted in movable supporting connection with the frame directing mechanism 218. In particular, in the exemplary embodiment, the plate member 236 is mounted in supporting connection with the pair of first pivot arms 220, 222. The plate member 236 is movable between an outward position and an inward position (shown in phantom). Movement of the frame 198 into the in/up position (and the container to the operative position) is associated with movement of the plate member 236 into the inward position. Movement of the frame 198 into the out/down position (and the container to the release position) is associated with movement of the plate member into the outward position. In the exemplary embodiment, the plate member 236 is disposed generally externally of the pair of first pivot arms 220, 222. The plate member of the exemplary embodiment is mounted in supporting connection with the arms through pins 246 or other suitable connecting members as shown.

In the exemplary embodiment, the plate member 236 includes a cam slot 240 therein having a substantially horizontal portion indicated H. Horizontal portion H of the slot intersects with a substantially vertical portion of the slot indicated V. The cam slot 240 is adapted to receive a pin member 242 which is operatively connected to a locking pin 244 mounted in slidable supporting connection with the first side 206 of the stationary member 196. In the exemplary embodiment, the locking pin 244 is disposed substantially internally of a first side 206 of the stationary member 196 and the pin member 242 extends through an elongated vertical slot 248 formed in the first side 206. In the exemplary embodiment the locking pin 244 is movably mounted in supporting connection with side 206. The locking pin is supported and constrained to move vertically through members extending through vertical guide slots in side 206. Of course this approach is exemplary.

The pin member 242 is adapted for relative displacement within the substantially horizontal portion H of the cam slot 240 toward and away from the substantially vertical portion V in association with movement of the plate member 236. In this exemplary embodiment, relative displacement of the pin member 242 within the substantially vertical portion V of the cam slot 240 is associated with vertical movement of the locking pin 244.

With particular reference to FIG. 13, a lever member 250 is mounted in pivotable connection with the first side 206 of the stationary member 196 and in operative connection with the pin member 242 extending from the locking pin 244. In the exemplary embodiment, the lever member 250 is mounted internally of the stationary member 196. The lever member 250 is operative to pivot about a first pivot axis 252, which is defined by a pin or other suitable member which enables rotational movement of the lever.

In the exemplary embodiment, the sheet storage container 186 includes a locking recess thereon 256. The locking pin 244 is adapted to engage the locking recess 256 when the sheet storage container 186 is in the operative position. The locking pin 244 is operative to slide relative the stationary member into a locked position, illustrated in FIG. 11, wherein the locking pin engages the recess 256. In this position the sheet storage container is retained in the operative position and the frame 198 is prevented from moving. In the exemplary embodiment, the locking pin 244 is aligned with and changeable in locking recess 256 only when the sheet storage container 186 is in the operative position.

Movement of the locking pin 244 with regard to engagement with the recess 256 is associated with pivotal movement of the lever member 250. Thus, movement of the locking pin 244 from an unlocked position into the locked position is associated with upward pivotal movement of a first end 260 of lever member 250, and downward movement of the pin member 242 in the substantially vertical portion V of cam slot 240. In the exemplary embodiment, a biasing member, or spring 262 is operative to urge the second end 264 of the lever member downwardly and the first end 260 of the lever member 250 upwardly, which in turn urges the locking pin 244 into the locked position.

When the locking pin and recess 256 are engaged the sheet storage container is held in the operative position and is enabled to accept sheets therein. To release the locking pin 244 and enable removal of the storage container, the first end of the lever member 250 is manually engaged and pivoted downwardly which moves the pin member upwardly in the substantially vertical portion V of the cam slot 240 toward the horizontal portion H. In the exemplary embodiment, the plate member 236 is biased toward the outward position by biasing member or spring 268. The location of spring 268 as illustrated is merely exemplary and other constructions are contemplated. When the pin member 242 reaches the horizontal portion H of the cam slot 240, the plate member is urged toward the outward position, and the first pivot arms are pivoted in a second manner to move the frame 198 into the out/down position. In this position the container is in the release position. Of course, other biasing members or approaches may be utilized to bias the frame 198 into the out/down position. From this position the storage container may be moved relative to the frame so as to be disengaged therefrom.

Thus, the locking pin 244 is adapted to automatically slide into engagement with the locking recess 256 in the sheet storage container 186 as the sheet storage container is moved into the operative position. Additionally, releasing the lever member 250 is operative to unlock the sheet storage container and automatically operate the frame moving mechanism. It should be understood that the releasable catch described for holding the container in the operative position is exemplary. In other embodiments other types of releasable catch mechanisms may be used.

In one exemplary embodiment, the ATM may be a rear-load ATM, wherein access to the interior area of the chest portion is obtained through a door mounted in supporting connection with the rear of the ATM housing. In a rear-load ATM the frame 198 is operative to move toward the front of the machine in order to place the sheet storage container 186 into the operative position. The sheet storage container may thus be removed away from the rear of the ATM.

In other exemplary embodiments, the ATM may be a front-load ATM, wherein access to the interior area of the chest portion is obtained through a chest door mounted in supporting connection with the front of the ATM housing. In a front-load ATM, the sheet storage container may be removed from the front of the ATM. Thus, the frame 198 would be adapted to move toward the rear of the machine in order to place the sheet storage container into the operative position.

In one exemplary embodiment, the stationary member 196, the plate member 236, and the pivot arms 220, 222 are constructed and operatively connected to be adapted for use with either rear-load or front-load ATMs. As illustrated in FIG. 11, the arcuate slots 230, 232 include extension portions 272, 274 to accommodate movement of first pivot arms 220, 222, respectively, in a front-load ATM. Additionally, the substantially horizontal portion H of the cam slot 240 includes a leg L to accommodate relative displacement of the pin member 242 toward and away from the substantially vertical portion V. As should be readily apparent, in a front-load ATM, the out/down position of the frame 198 would be toward the front of the ATM. Likewise, outward movement of the plate member would be toward the front of the ATM. In a rear-load ATM, the U-shaped body of the frame 198 is positioned so that the legs extend toward the rear of the machine. In a front-load ATM the legs extend toward the front of the machine.

In exemplary embodiments, the sheet storage container may comprise a free-fall or bulk storage container. In other exemplary embodiments, the sheet storage container may comprise one or more stacking mechanisms operative to receive sheets through the sheet acceptor opening, and stack the received sheets. In other embodiments, the sheet storage container may be in operative connection with one or more note dispenser mechanisms so that received currency may be recycled to the same or other users of the machine.

An exemplary embodiment may further include a monitoring mechanism operative to provide audible feedback or other human perceptible indication or output when the sheet storage container is moved into the operative position similar to the monitoring mechanisms 192 discussed earlier with respect to FIGS. 5-7. The monitoring mechanism may include one or more sensors and a stand-alone circuit control assembly or other suitable apparatus. Other mechanisms able to generate audible or other indications that the sheet storage container has been moved from into the operative position may be used.

A method of operation includes supporting a sheet storage container 186 in a release position in operatively supported connection a movable frame 198, wherein the movable frame is initially disposed at the out/down position. The container is then moved relative to and in engagement with the movable frame from the unmounted position to a mounted position. With the container mounted on the frame, the frame is moved horizontally and inwardly relative to the chest opening controlled by the chest door. Such movement causes the frame directing mechanism 218 to direct the movable frame into the in/up position in order to place the sheet storage container into the operative position.

As the frame moves into the in/up position, the plate member 236 is moved from an outward position to an inward position, and the pin member 242 moves within the horizontal portion H of the cam slot 240 relative to the plate member until it is aligned with the substantially vertical portion V. When the pin member reaches the substantially vertical portion of the slot, a biased lever member 250 pulls the pin member downwardly, causing the locking pin 244, which is slidably mounted in supporting connection with the stationary member 196, to engage a recess 256 in the sheet stacking container. Simultaneously, as the locking pin engages the recess, a first end of the lever member is upwardly moved responsive to pivoting motion. When the locking pin 244 is in the locked position, the sheet storage container is retained in the operative position and the frame is prevented from moving. A monitoring mechanism 192 may sense and provide audible feedback to indicate that the sheet storage container has reached the operative position.

In order to unlock the sheet storage container, the first end of the lever member 250 is downwardly moved. This causes the lever to pivot and the locking pin 244 is lifted away from engagement with the locking recess 256. Simultaneously, the pin member 242 moves in the substantially vertical portion V of the cam slot 240 until it reaches the substantially horizontal portion H. Upon pin 242 reaching the vertical portion of the cam slot the biased plate member 236 moves toward the outward position causing the frame moving mechanism 218 to move the frame into the out/down position. In some embodiments the frame moving mechanism may also be separately biased by a suitable spring or other biasing device toward the out/down position.

The sheet storage container 186 is then moved relative to and in supporting connection with the frame 198 away from the mounted position to the unmounted position. Once the container is disengaged from the frame it may be removed from the machine.

To service a rear-load ATM, a chest door 50 mounted in supporting connection with the rear of the housing is opened to provide access to the interior area of the chest portion. To service a front-load ATM, a door mounted in supporting connection with the front of the housing is opened to provide access to the interior area of the chest portion. The exemplary embodiment may further include a sheet acceptor 80 mounted in movable relation to the ATM housing. When the sheet acceptor 80 is in an operative position, and the sheet storage container is in an operative position, sheets are enabled to pass from the sheet acceptor to the sheet storage container.

With respect to FIGS. 14-18, an exemplary embodiment of a movable sheet acceptor 80 is shown. Although the ability of the exemplary embodiment to move the sheet acceptor 80 through a service opening of the ATM facilitates servicing, problems are still potentially present by the need to have to remove cover panels and the like from the sheet acceptor. Further, there is always a risk that cover panels, once removed, will not be replaced resulting in infiltration of contaminants to the sheet acceptor and causing malfunctions and failures.

Figure 14:
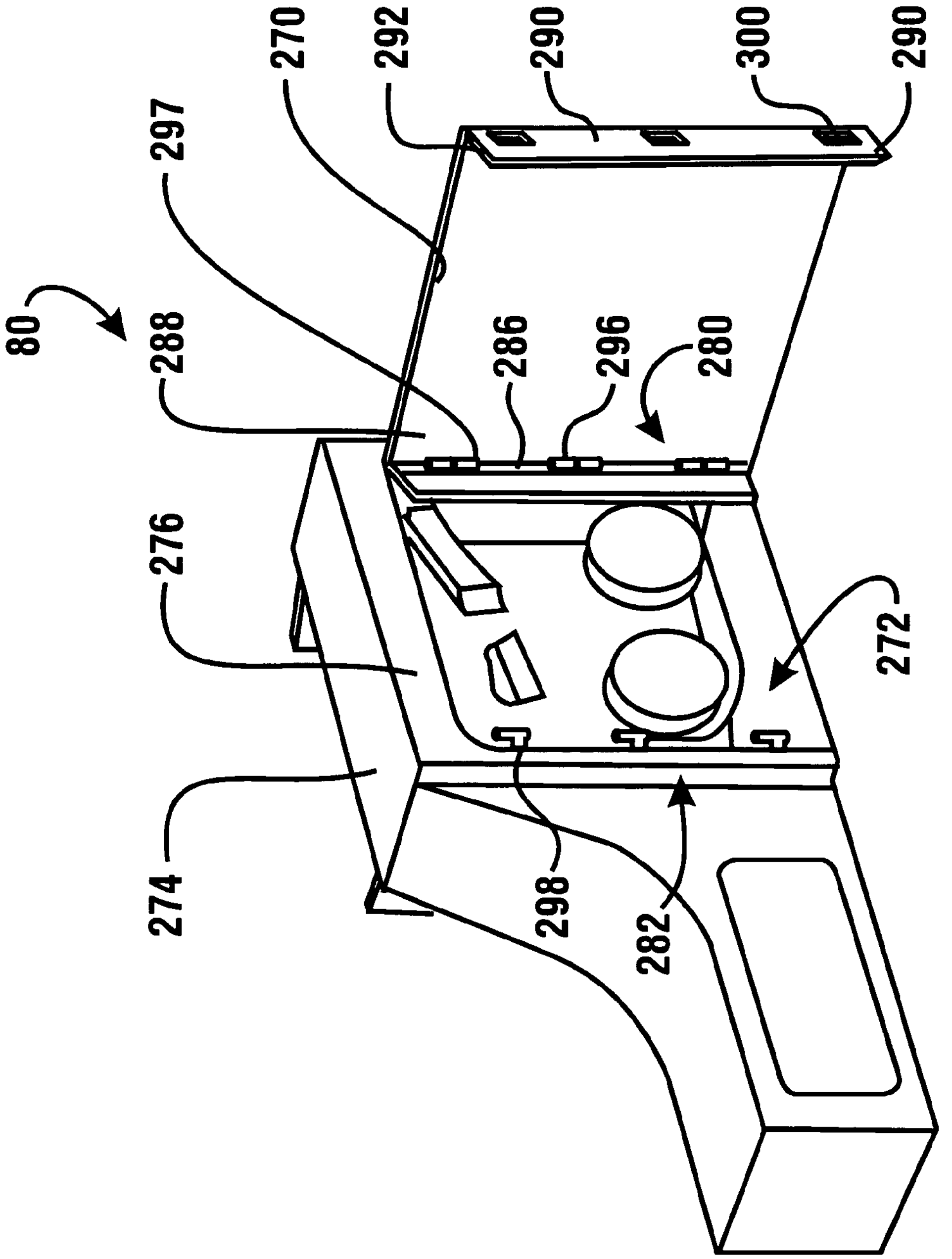
FIG. 14 is a schematic view of a sheet acceptor showing a service cover in an open condition.

To reduce the risk of service persons not replacing service panels the exemplary embodiments, such panels are made to minimize the risk that service panels will be removed and not replaced. As shown in FIG. 14, in one exemplary embodiment, a service cover 270 is mounted in movable supporting connection with a main housing 274 of a sheet acceptor 80. The service cover 270 is operative to selectively close an access opening 272 to an interior of the main housing. In the exemplary embodiment, the access opening 272 is in a first side wall 276 of the main housing 274. When the sheet acceptor 80 is in an operative position, the access opening is not accessible. Movement of the sheet acceptor 80 relative the ATM housing 46 is operative to render the access opening accessible. Various components and mechanisms of the sheet acceptor 80 may be accessed for servicing through the access opening. Of course, as can be appreciated, suitable latching mechanisms or other holding devices may be used so as to assure that once the service cover is returned to its closed position, it remains therein until such time as the service cover needs to be opened again for servicing: In alternate embodiments, there may be a second access opening to the interior of the main housing in an opposite side wall.

In the exemplary embodiment, the sheet acceptor 80 includes a first mounting site 280 along a first side of the access opening and a second mounting site 282 along a second side of the access opening. The service cover 270 is adapted to be selectively mounted to the first side wall 276 at either the first mounting site 280 or the second mounting site 282. When the cover 270 is mounted at the first mounting site 280, the cover is operative to swing away from the access opening in a first direction, indicated by the arrow in FIG. 16B, and when the cover is mounted at the second mounting site 282, the cover is operative to swing away from the access opening in the opposite direction, indicated by the arrow in FIG. 15B.

Figures 15A, 15B, 15C, 16A, 16B, 17, 18:
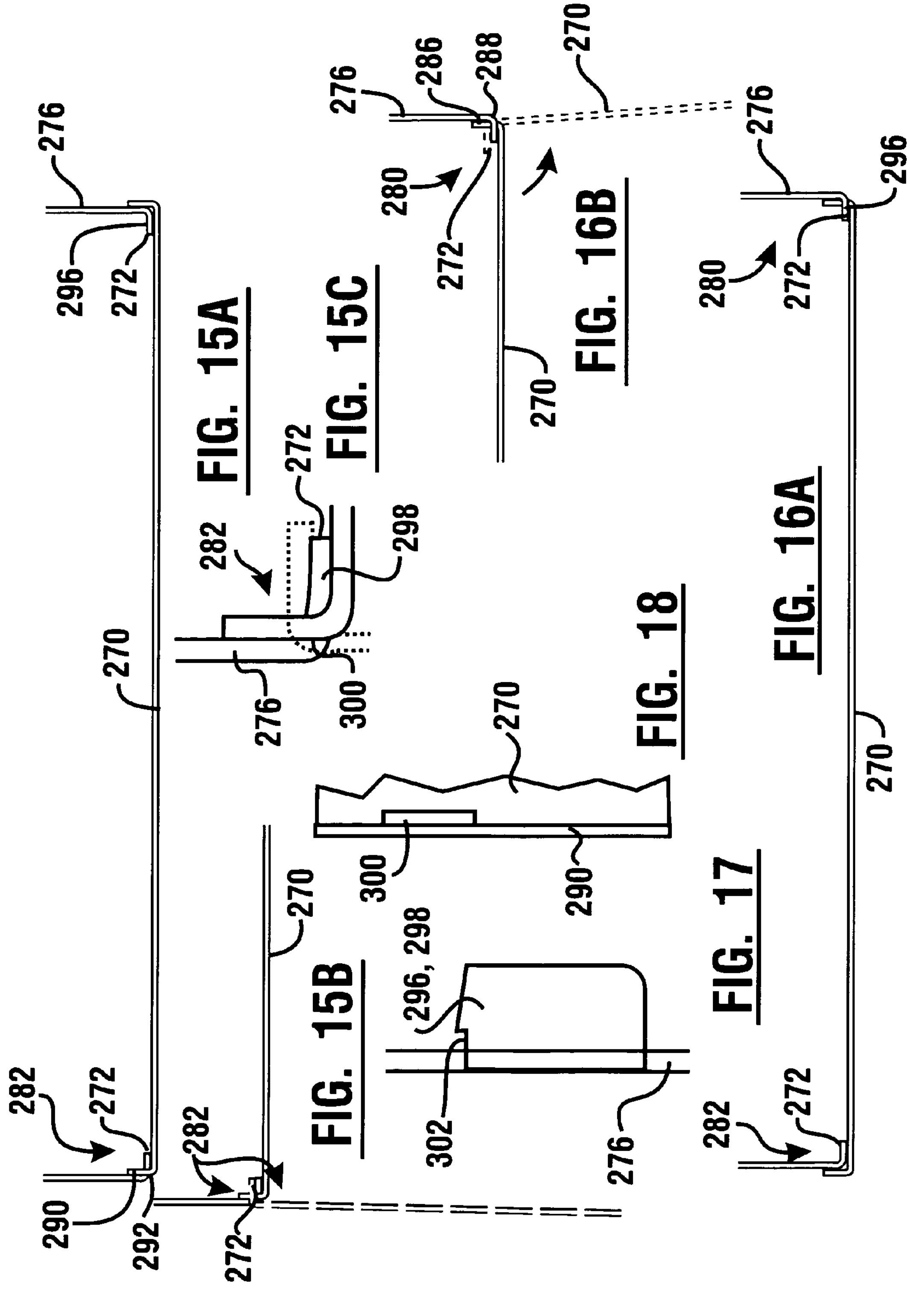
FIG. 15A is a partial top view of a sheet acceptor housing showing a service cover in a closed position.
FIG. 15B is a partial top view of a sheet acceptor housing showing a service cover opening away from an access opening in a first direction.
FIG. 15C is an enlarged view of the area shown in FIG. 15B.
FIG. 16A is a partial top view of the sheet acceptor housing of FIG. 15A showing the service panel in an alternate closed position.
FIG. 16B is a partial top view of a sheet acceptor housing showing a service cover opening away from an access opening in a second direction.
FIG. 17 is a partial side view of a sheet acceptor housing illustrating a tab.
FIG. 18 is a partial side view of a service cover illustrating a slot.

In the exemplary embodiment, the cover includes a first flange 286 at a first end 288 and a second flange 290 at a second end 292. When the cover is selectively mounted at the first mounting site, and in a closed position, the first flange 286 is adapted to extend into the main housing 274 and the second flange 290 is adapted to extend outside the main housing 274, as shown in FIG. 16A. Alternately, when the cover is selectively mounted at the second mounting site 282, and in the closed position, the second flange 290 is adapted to extend into the main housing 274 and the first flange 286 is adapted to extend outside the main housing.

In the exemplary embodiment, a first set of tabs 296 extends from the main housing 274 into the access opening along a first edge thereof. A first set of corresponding slots 297 are disposed adjacent the first flange 286. A second set of tabs 298 extends from the main housing 274 into the access opening 272 along a second edge thereof. A second set of corresponding slots 300 are disposed adjacent the second flange 290. When the cover is selectively mounted at the first mounting site 280, each of the first set of tabs 296 is operatively engaged within one of the first set of corresponding slots 297. When the cover is selectively mounted at the second mounting site 282, each of the second set of tabs 298 is operatively engaged within one of the second set of corresponding slots. The operative engagement of a set of tabs in the set of corresponding slots enables the cover to be pivoted with respect to the main housing. Alternately, the tabs and slots are constructed so as to allow the cover to be totally removed from the access opening. In the exemplary embodiment, each of the tabs includes a recessed surface 302 for operatively engaging the cover. To selectively remove the cover, the cover may be lifted slightly to disengage it from the recessed surfaces. Of course this construction is exemplary.

To service an ATM comprising the movable sheet acceptor 80, an access door, such as door 58 may be opened. The sheet acceptor 80 is moved relative to and in supporting connection with the chest portion from an operative position to a service position. The access opening 272 in the main housing 274 is opened by selectively swinging the cover 270 relative the main housing, or alternately, lifting the cover away from the access opening. After performing a service activity, the access opening may be closed by selectively replacing the cover 270 so one of the flanges extends within the main housing and the other flange extends outside the main housing. If the cover were selectively lifted away from the access opening, then closing the access opening also includes operatively engaging one of the set of tabs within the corresponding set of slots. In alternate embodiments, the main housing and/or the access cover may include sensors or other devices operative to indicate the presence or absence of the cover 270.

While the exemplary embodiments include particular structures to achieve the desirable results, those having skill in the art may devise numerous other embodiments with other structures which employ the same inventive principles described herein and which are encompassed by the subject matter as claimed.

Thus the exemplary embodiments of the present invention achieve the above stated objectives, eliminates difficulties encountered in the making and use of prior devices, solves problems, and attains the desirable results described herein.

In the foregoing description certain terms have been used for brevity, clarity, and understanding. However, no unnecessary limitations are to be implied therefrom because such terms are for descriptive purposes and are intended to be broadly construed. Moreover, the descriptions and illustrations herein are given by way of examples and the invention is not limited to the exact details shown and described.

In the following claims any feature described as a means for performing a function will be construed as encompassing any means capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

We claim:

1. Apparatus comprising:

an automated banking machine including:

a housing, wherein the housing includes at least one access opening to an interior area inside the housing, wherein the housing includes at least one access control member, wherein the at least one access control member is movable between an open position and a closed position, wherein the at least one access control member in the open position allows a machine servicer to access the interior area through the at least one access opening, wherein the at least one access control member in the closed position prevents a machine servicer from accessing the interior area through the at least one access opening;

a user interface;

a currency note dispenser;

a removable container, wherein the container is adapted to hold currency notes, wherein the container is removably positionable in a operative position within the interior area, wherein in the operative position the container is operationally positioned in the machine;

at least one container positioning sensor operative to sense that the container is placed in the operative position;

an audible output device in operative connection with the at least one container positioning sensor, wherein with the at least one access control member in the open position, sensing by the at least one container positioning sensor of placement of the container in the operative position causes the audible output device to provide an audible servicing output for a machine servicer.

2. The apparatus according to claim 1 wherein the housing includes a secure chest portion, and wherein the container is removably mounted in the secure chest portion.

3. The apparatus according to claim 2 and further including a note accepting mechanism in operatively supported connection with the housing outside the secure chest portion, wherein the secure chest portion includes a chest opening, wherein the note accepting mechanism is operative to cause notes to pass through the chest opening, and wherein in the operative position of the container, notes passing through the chest opening move into the container.

4. The apparatus according to claim 3 wherein the note accepting mechanism is operative to receive a stack of notes, separate each note from the stack, evaluate each note for at least one property corresponding to genuine notes, and to cause each note having the at least one property corresponding to genuine notes to pass through the opening.

5. The apparatus according to claim 4 wherein the machine further includes a currency note recycling mechanism.

6. The apparatus according to claim 4 and further comprising:

a mounting structure, wherein the mounting structure is releasibly engageable with the container, and wherein the mounting structure includes a mechanism, wherein the mechanism is operative to direct movement of the container to and from the operative position.

7. The apparatus according to claim 1 wherein the housing includes a secure chest portion, wherein the interior area is inside the secure chest portion, wherein the secure chest portion includes a service door, wherein the at least one access control member comprises the service door.

8. A method comprising:

a) engaging a removable sheet storage container and mounting structure in an interior area of a secure chest portion of a housing of an automated transaction machine, wherein the housing includes at least one access opening to the interior area, wherein the housing includes at least one access control member, wherein the at least one access control member is movable between an open position and a closed position, wherein the at least one access control member in the open position allows a machine servicer to access the interior area through the at least one access opening, wherein the at least one access control member in the closed position prevents a machine servicer from accessing the interior area through the at least one access opening;

b) subsequent to (a), moving the sheet storage container into in a direction toward an operative position, wherein in the operative position the sheet storage container is operationally positioned in the machine; and c) subsequent to (b), moving the sheet storage container further in the direction until an audible servicing output is heard, wherein the audible servicing output indicates to a machine servicer that the sheet storage container is located in the operative position;

wherein in (a)-(c) the at least one access control member is in the open position.

9. The method of claim 8 further comprising:

d) receiving at least one note into the sheet storage container through a sheet accepting opening in the chest portion, wherein the at least one note is passed through the sheet accepting opening responsive to operation of a sheet acceptor adapted to receive a stack comprising a plurality of notes, to separate each of the notes from the stack, to evaluate each note, to segregate suspected invalid notes from valid notes, and to pass valid notes through the sheet accepting opening.

10. The method of claim 9 further including:

e) storing the at least one note through operation of a note storage mechanism, wherein the note storage mechanism is operative to store notes in accordance with the denomination of such notes.

11. The method according to claim 8 wherein (b) includes moving the container both horizontally and vertically in operatively supported connection with a frame of the mounting structure, and further comprising:

(d) holding the container in the operative position through operation of a releasable catch.

12. The method according to claim 11 and further comprising:

(e) with the container in the operative position, releasing the catch;

(f) responsive to (e) moving the container horizontally and downward relative to the operative position while in operatively supported connection with the frame;

(g) subsequent to (f), operatively disengaging the container and the frame.

13. The method of claim 8 wherein step (a) includes engaging the container and a mounting structure that is movable relative to the housing, and wherein step (b) includes moving the container while engaged with the mounting structure into the operative position.

14. A method comprising:

(a) moving a removable sheet storage container relative to a housing of an automated banking machine, wherein during the moving the container is moved from outside the housing to at least one position in operatively supported connection with the housing, wherein the housing includes a secure chest portion, wherein the chest portion includes a service door, wherein the door is movable by a machine servicer between an open position and a closed position, wherein during the moving of the container the door is in the open position;

(b) subsequent to step (a), further moving the container until receiving from the machine, at least one audible output indicating that the container is operationally positioned in the machine.

15. The method of claim 14 wherein step (b) includes ceasing movement of the container in response to hearing an audible servicing output produced by an audible output device of the machine responsive to the machine sensing that the container move into an operative position.

16. The method of claim 14 wherein step (b) includes moving the container to cause a container positioning sensor of the machine to sense that the container is properly positioned to accept sheets into the container.

17. The method of claim 15 and further comprising (c) hearing at least one beep sound produced by the audible output device; wherein step (b) includes ceasing movement of the container in response to hearing the at least one beep sound.

18. Apparatus comprising:

an automated banking machine including:

a housing, wherein the housing includes a secure chest portion, and wherein the chest portion includes a sheet accepting opening therein;

a sheet acceptor, wherein the sheet acceptor is operative to receive a stack including a plurality of notes from a user, to separate each of the notes from the stack, to evaluate each note, to segregate suspected invalid notes from valid notes and to direct valid notes to the sheet accepting opening;

a sheet storage container extending in the chest portion, wherein in an operative position the sheet storage container is operative to store notes within the sheet storage container that have been passed through the sheet accepting opening, and wherein the sheet storage container is removable from the automated banking machine and movable into engagement with the automated banking machine;

a sensor in the machine, wherein the sensor is operative to sense placement of the sheet storage container in the operative position;

an audible output device, wherein the audible output device is in operative connection with the sensor, wherein the audible output device is operative to audibly indicate placement of the container in the operative position.

19. The apparatus according to claim 18 wherein the automated banking machine includes a currency dispenser, and wherein the currency dispenser is operative to dispense currency notes from the chest portion.

20. The apparatus according to claim 18 wherein the sensor comprises a container positioning sensor, wherein the housing includes at least one service door, wherein the at least one service door is movable between an open position and a closed position, wherein the at least one service door in the open position allows a servicer of the machine to place the container in the operative position, wherein responsive to the container positioning sensor sensing placement of the container in the operative position and with the at least one service door in the open position, the audible output device operates to, provide an audible servicing output for the servicer.

* * * * *